(12) United States Patent
Androulakis et al.

(10) Patent No.: US 11,358,433 B2
(45) Date of Patent: Jun. 14, 2022

(54) THERMAL CONDITIONING SYSTEMS AND METHODS FOR VEHICLE REGIONS

(71) Applicant: Gentherm Incorporated, Northville, MI (US)

(72) Inventors: Ioannis Androulakis, Azusa, CA (US); Maurice Edward Phillips Gunderson, Orinda, CA (US); Wayne Swoyer Kauffman, III, Oak Park, MI (US); Dmitri Kossakovski, South Pasadena, CA (US); Darren Andrew Schumacher, Ann Arbor, MI (US); Scott Wolas, Newbury Park, CA (US)

(73) Assignee: GENTHERM INCORPORATED, Northville, MI (US)

(*) Notice: Subject to any disclaimer, the term of this patent is extended or adjusted under 35 U.S.C. 154(b) by 163 days.

(21) Appl. No.: 16/803,771

(22) Filed: Feb. 27, 2020

(65) Prior Publication Data
US 2020/0215870 A1 Jul. 9, 2020

Related U.S. Application Data

(63) Continuation of application No. 15/536,407, filed as application No. PCT/US2015/066432 on Dec. 17, 2015, now Pat. No. 10,603,976.
(Continued)

(51) Int. Cl.
*B60H 1/00* (2006.01)
*B60N 2/56* (2006.01)
*B60H 1/32* (2006.01)

(52) U.S. Cl.
CPC ..... *B60H 1/00028* (2013.01); *B60H 1/00285* (2013.01); *B60H 1/00321* (2013.01);
(Continued)

(58) Field of Classification Search
CPC ............ B60H 1/00028; B60H 1/00285; B60H 2001/002; B60H 2001/00228; B60H 2001/003
(Continued)

(56) References Cited

U.S. PATENT DOCUMENTS

| | | |
|---|---|---|
| 413,136 A | 10/1889 | Dewey |
| 2,118,636 A | 5/1938 | Alexander et al. |

(Continued)

FOREIGN PATENT DOCUMENTS

| | | |
|---|---|---|
| CN | 1094500 | 11/1994 |
| CN | 1158655 | 9/1997 |

(Continued)

OTHER PUBLICATIONS

U.S. Appl. No. 16/669,356, filed Oct. 30, 2019, Bell et al.
(Continued)

*Primary Examiner* — Henry T Crenshaw
(74) *Attorney, Agent, or Firm* — Knobbe Martens Olson & Bear LLP

(57) ABSTRACT

Features for a vapor compression system configured to cool and/or cat (i.e. thermally condition) two or more distinct climate controlled vehicle interior components via a common thermal bus are disclosed. Some embodiments employ a single compressor. Some embodiments employ multiple compressors and/or thermal buses, each servicing components located within respective interior thermal zones of a vehicle, for example a front row seat zone, second and/or third row seat zones, and/or an overhead zone and/or a trunk zone.

30 Claims, 11 Drawing Sheets

Related U.S. Application Data

(60) Provisional application No. 62/241,514, filed on Oct. 14, 2015, provisional application No. 62/094,852, filed on Dec. 19, 2014.

(52) U.S. Cl.
CPC ............ *B60H 1/3204* (2013.01); *B60N 2/56* (2013.01); *B60N 2/5621* (2013.01); *B60N 2/5685* (2013.01); *B60N 2/5692* (2013.01); *B60H 2001/002* (2013.01); *B60H 2001/003* (2013.01); *B60H 2001/00192* (2013.01); *B60H 2001/00228* (2013.01)

(58) Field of Classification Search
USPC ........................................................ 62/185
See application file for complete search history.

(56) References Cited

U.S. PATENT DOCUMENTS

| | | |
|---|---|---|
| 2,362,259 A | 11/1944 | Findley |
| 2,363,168 A | 11/1944 | Findley |
| 2,912,832 A | 11/1959 | Clark |
| 2,944,404 A | 7/1960 | Fritts |
| 2,949,014 A | 8/1960 | Belton, Jr. et al. |
| 2,984,077 A | 5/1961 | Gaskill |
| 2,997,514 A | 8/1961 | Roeder, Jr. |
| 3,040,538 A | 6/1962 | Alsing |
| 3,085,405 A | 4/1963 | Frantti |
| 3,125,860 A | 3/1964 | Reich |
| 3,136,577 A | 6/1964 | Richard |
| 3,138,934 A | 6/1964 | Roane |
| 3,165,900 A | 1/1965 | Huntington |
| 3,196,620 A | 7/1965 | Elfving et al. |
| 3,212,275 A | 10/1965 | Tillman, Jr. |
| 3,213,630 A | 10/1965 | Mole |
| 3,236,056 A | 2/1966 | Phillips et al. |
| 3,252,504 A | 5/1966 | Newton |
| 3,391,727 A | 7/1968 | Topouszian |
| 3,599,437 A | 8/1971 | Panas |
| 3,779,307 A | 12/1973 | Weiss et al. |
| 3,817,043 A | 6/1974 | Zoleta |
| 3,885,126 A | 5/1975 | Sugiyama et al. |
| 4,051,691 A | 10/1977 | Dawkins |
| 4,065,936 A | 1/1978 | Fenton et al. |
| 4,193,271 A | 3/1980 | Honigsbaum |
| 4,280,330 A | 7/1981 | Harris et al. |
| 4,402,188 A | 9/1983 | Skala |
| 4,459,466 A | 7/1984 | Nakagawa et al. |
| 4,565,072 A | 1/1986 | Fujiwara et al. |
| 4,570,450 A | 2/1986 | Takemi et al. |
| 4,572,430 A | 2/1986 | Takagi et al. |
| 4,637,220 A | 1/1987 | Sakano |
| 4,658,599 A | 4/1987 | Kajiwara |
| 4,665,707 A | 5/1987 | Hamilton |
| 4,665,971 A | 5/1987 | Sakurai |
| 4,707,995 A | 11/1987 | Assaf |
| 4,823,554 A | 4/1989 | Trachtenberg et al. |
| 4,848,090 A | 7/1989 | Peters |
| 4,858,069 A | 8/1989 | Hughes |
| 4,905,475 A | 3/1990 | Tuomi |
| 4,922,721 A | 5/1990 | Robertson et al. |
| 4,922,998 A | 5/1990 | Carr |
| 4,923,248 A | 5/1990 | Feher |
| 4,947,735 A | 8/1990 | Guillemin |
| 4,988,847 A | 1/1991 | Argos et al. |
| 5,029,446 A | 7/1991 | Suzuki |
| 5,042,566 A | 8/1991 | Hildebrand |
| 5,092,129 A | 3/1992 | Bayes et al. |
| 5,097,829 A | 3/1992 | Quisenberry |
| 5,099,654 A | 3/1992 | Baruschke et al. |
| 5,111,664 A | 5/1992 | Yang |
| 5,119,640 A | 6/1992 | Conrad |
| 5,138,851 A | 8/1992 | Mardikian |
| 5,167,129 A | 12/1992 | Akasaka |
| 5,193,347 A | 3/1993 | Apisdorf |
| 5,198,930 A | 3/1993 | Muratomi |
| 5,269,145 A | 12/1993 | Krause et al. |
| 5,269,146 A | 12/1993 | Kerner |
| 5,279,459 A | 1/1994 | Single, II |
| 5,291,960 A | 3/1994 | Brandenburg et al. |
| 5,300,197 A | 4/1994 | Mitani et al. |
| 5,303,771 A | 4/1994 | Des Champs |
| 5,316,078 A | 5/1994 | Cesaroni |
| 5,385,020 A | 1/1995 | Gwilliam et al. |
| 5,386,823 A | 2/1995 | Chen |
| 5,399,120 A | 3/1995 | Burns et al. |
| 5,407,130 A | 4/1995 | Uyeki et al. |
| 5,431,021 A | 7/1995 | Gwilliam et al. |
| 5,448,891 A | 9/1995 | Nakagiri et al. |
| 5,450,894 A | 9/1995 | Inoue et al. |
| 5,483,807 A | 1/1996 | Abersfelder et al. |
| 5,499,504 A | 3/1996 | Mill et al. |
| 5,549,153 A | 8/1996 | Baruschke et al. |
| 5,556,028 A | 9/1996 | Khelifa |
| 5,564,276 A | 10/1996 | Abadilla et al. |
| 5,590,532 A | 1/1997 | Bachman |
| 5,605,047 A | 2/1997 | Park et al. |
| 5,626,021 A | 5/1997 | Karunasiri et al. |
| 5,641,016 A | 6/1997 | Isaji et al. |
| 5,653,111 A | 8/1997 | Attey et al. |
| 5,673,964 A | 10/1997 | Roan et al. |
| 5,694,770 A | 12/1997 | Bruck et al. |
| 5,711,155 A | 1/1998 | DeVilbiss et al. |
| 5,715,695 A | 2/1998 | Lord |
| 5,722,249 A | 3/1998 | Miller, Jr. |
| 5,725,048 A | 3/1998 | Burk et al. |
| 5,740,681 A | 4/1998 | Karl |
| 5,802,856 A | 9/1998 | Schaper et al. |
| 5,816,236 A | 10/1998 | Moroi et al. |
| 5,878,589 A | 3/1999 | Tanaka et al. |
| 5,878,950 A | 3/1999 | Faccone et al. |
| 5,890,371 A | 4/1999 | Rajasubramanian et al. |
| 5,899,086 A | 5/1999 | Noda et al. |
| 5,901,572 A | 5/1999 | Peiffer et al. |
| RE36,242 E | 6/1999 | Apisdorf |
| 5,910,159 A | 6/1999 | Matsuo et al. |
| 5,918,930 A | 7/1999 | Kawai et al. |
| 5,921,088 A | 7/1999 | Imaizumi et al. |
| 5,921,314 A | 7/1999 | Schuller et al. |
| 5,955,772 A | 9/1999 | Shakouri et al. |
| 5,964,092 A | 10/1999 | Tozuka et al. |
| 5,975,856 A | 11/1999 | Welle |
| 5,977,785 A | 11/1999 | Burward-Hoy |
| 6,002,105 A | 12/1999 | Tamada |
| 6,016,662 A | 1/2000 | Tanaka et al. |
| 6,047,770 A | 4/2000 | Suzuki et al. |
| 6,059,198 A | 5/2000 | Moroi et al. |
| 6,105,659 A | 8/2000 | Pocol et al. |
| 6,119,463 A | 9/2000 | Bell |
| 6,138,749 A | 10/2000 | Kawai et al. |
| 6,158,225 A | 12/2000 | Muto et al. |
| 6,205,802 B1 | 3/2001 | Drucker et al. |
| 6,205,805 B1 | 3/2001 | Takahashi et al. |
| 6,213,198 B1 | 4/2001 | Shikata et al. |
| 6,223,539 B1 | 5/2001 | Bell |
| 6,247,530 B1 | 6/2001 | Mochizuki et al. |
| 6,254,179 B1 | 7/2001 | Kortum et al. |
| 6,270,015 B1 | 8/2001 | Hirota |
| 6,276,166 B1 | 8/2001 | Sarkisian et al. |
| 6,293,107 B1 | 9/2001 | Kitagawa |
| 6,324,860 B1 | 12/2001 | Maeda et al. |
| 6,334,311 B1 | 1/2002 | Kim et al. |
| 6,346,668 B1 | 2/2002 | McGrew |
| 6,366,832 B2 | 4/2002 | Lomonaco et al. |
| 6,393,842 B2 | 5/2002 | Kim |
| 6,401,462 B1 | 6/2002 | Bielinski |
| 6,412,287 B1 | 7/2002 | Hughes et al. |
| 6,431,257 B1 | 8/2002 | Sano et al. |
| 6,435,273 B1 | 8/2002 | Futernik |
| 6,438,964 B1 | 8/2002 | Giblin |
| 6,453,993 B1 | 9/2002 | Bujak, Jr. |
| 6,457,324 B2 | 10/2002 | Zeigler et al. |
| 6,464,027 B1 | 10/2002 | Dage et al. |

(56) References Cited

U.S. PATENT DOCUMENTS

| | | |
|---|---|---|
| 6,474,081 B1 | 11/2002 | Feuerecker |
| 6,481,213 B2 | 11/2002 | Carr et al. |
| 6,505,886 B2 | 1/2003 | Gielda et al. |
| 6,510,696 B2 | 1/2003 | Guttman et al. |
| 6,530,842 B1 | 3/2003 | Wells et al. |
| 6,530,920 B1 | 3/2003 | Whitcroft et al. |
| 6,539,725 B2 | 4/2003 | Bell |
| 6,539,729 B2 | 4/2003 | Tupis et al. |
| 6,560,968 B2 | 5/2003 | Ko |
| 6,568,205 B2 | 5/2003 | Bureau et al. |
| 6,569,550 B2 | 5/2003 | Khelifa |
| RE38,128 E | 6/2003 | Gallup et al. |
| 6,598,403 B1 | 7/2003 | Ghoshal |
| 6,606,877 B2 | 8/2003 | Tomita et al. |
| 6,607,142 B1 | 8/2003 | Boggs et al. |
| 6,625,990 B2 | 9/2003 | Bell |
| 6,640,889 B1 | 11/2003 | Harte et al. |
| 6,682,844 B2 | 1/2004 | Gene |
| 6,715,307 B2 | 4/2004 | Hatakeyama et al. |
| 6,722,139 B2 | 4/2004 | Moon et al. |
| 6,732,534 B2 | 5/2004 | Spry |
| 6,779,348 B2 | 8/2004 | Taban |
| 6,793,016 B2 | 9/2004 | Aoki et al. |
| 6,807,811 B2 | 10/2004 | Lee |
| 6,812,395 B2 | 11/2004 | Bell |
| 6,854,286 B2 | 2/2005 | Bureau et al. |
| 6,862,892 B1 | 3/2005 | Meyer et al. |
| 6,883,602 B2 | 4/2005 | Drucker |
| 6,886,351 B2 | 5/2005 | Palfy et al. |
| 6,886,356 B2 | 5/2005 | Kubo et al. |
| 6,896,047 B2 | 5/2005 | Currie et al. |
| 6,907,739 B2 | 6/2005 | Bell |
| 6,910,345 B2 | 6/2005 | Horstmann et al. |
| 6,915,641 B2 | 7/2005 | Harvie |
| 6,951,114 B2 | 10/2005 | Grisham et al. |
| 6,959,555 B2 | 11/2005 | Bell |
| 6,962,195 B2 | 11/2005 | Smith et al. |
| 6,973,799 B2 | 12/2005 | Kuehl et al. |
| 7,007,491 B2 | 3/2006 | Grimm et al. |
| 7,063,139 B2 | 6/2006 | Horn et al. |
| 7,073,338 B2 | 7/2006 | Harwood et al. |
| 7,074,122 B2 | 7/2006 | Haupt et al. |
| 7,089,756 B2 | 8/2006 | Hu |
| 7,111,465 B2 | 9/2006 | Bell |
| 7,134,288 B2 | 11/2006 | Crippen et al. |
| 7,168,398 B2 | 1/2007 | Ap et al. |
| 7,171,955 B2 | 2/2007 | Perkins |
| 7,231,772 B2 | 6/2007 | Bell |
| 7,238,101 B2 | 7/2007 | Kadle et al. |
| 7,240,725 B2 | 7/2007 | Horn et al. |
| 7,246,496 B2 | 7/2007 | Goenka et al. |
| 7,263,835 B2 | 9/2007 | Lin |
| 7,264,046 B1 | 9/2007 | Futernik et al. |
| 7,272,936 B2 | 9/2007 | Feher |
| 7,290,400 B2 | 11/2007 | Heberle et al. |
| 7,310,953 B2 | 12/2007 | Pham et al. |
| 7,338,117 B2 | 3/2008 | Iqbal et al. |
| 7,350,368 B2 | 4/2008 | Heberle et al. |
| 7,363,766 B2 | 4/2008 | Eisenhour |
| 7,380,586 B2 | 6/2008 | Gawthrop |
| 7,416,138 B2 | 8/2008 | Ellison et al. |
| 7,426,835 B2 | 9/2008 | Bell |
| 7,530,390 B2 | 5/2009 | Feuerecker et al. |
| 7,533,535 B2 | 5/2009 | Kadle et al. |
| 7,578,341 B2 | 8/2009 | Ichishi et al. |
| 7,581,584 B2 | 9/2009 | Yoneno et al. |
| 7,587,901 B2 | 9/2009 | Petrovski |
| 7,587,902 B2 | 9/2009 | Bell |
| 7,603,205 B2 | 10/2009 | Barry et al. |
| 7,650,757 B2 | 1/2010 | Bhatti |
| 7,743,614 B2 | 6/2010 | Goenka et al. |
| 7,765,824 B2 | 8/2010 | Wong et al. |
| 7,779,639 B2 | 8/2010 | Goenka |
| 7,784,289 B2 | 8/2010 | Scherer et al. |
| 7,788,933 B2 | 9/2010 | Goenka |
| 7,828,050 B2 | 11/2010 | Esaki |
| 7,870,892 B2 | 1/2011 | Gawthrop |
| 7,905,278 B2 | 3/2011 | Sato et al. |
| 7,932,460 B2 | 4/2011 | Bell |
| 7,937,952 B2 | 5/2011 | Johnson |
| 7,942,010 B2 | 5/2011 | Bell |
| 7,946,120 B2 | 5/2011 | Bell |
| 7,950,735 B2 | 5/2011 | Major et al. |
| 8,015,835 B2 | 9/2011 | Lee et al. |
| 8,039,726 B2 | 10/2011 | Zhang et al. |
| 8,069,674 B2 | 12/2011 | Bell |
| 8,079,223 B2 | 12/2011 | Bell |
| 8,082,752 B2 | 12/2011 | Liu et al. |
| 8,104,294 B2 | 1/2012 | Reeve |
| 8,104,295 B2 | 1/2012 | Lofy |
| 8,136,874 B2 | 3/2012 | Negrini et al. |
| 8,261,868 B2 | 9/2012 | Goenka et al. |
| 8,359,871 B2 | 1/2013 | Woods et al. |
| 8,408,012 B2 | 4/2013 | Goenka et al. |
| 8,438,863 B2 | 5/2013 | Lofy |
| 8,490,412 B2 | 7/2013 | Bell et al. |
| 8,495,884 B2 | 7/2013 | Bell et al. |
| 8,613,200 B2 | 12/2013 | LaGrandeur et al. |
| 8,631,659 B2 | 1/2014 | Goenka |
| 8,640,466 B2 | 2/2014 | Bell et al. |
| 8,678,492 B2 | 3/2014 | Benton |
| 8,722,222 B2 | 5/2014 | Kossakovski et al. |
| 8,733,126 B2 | 5/2014 | Sekiya et al. |
| 8,783,397 B2 | 7/2014 | Goenka et al. |
| 8,784,166 B2 | 7/2014 | Mazzocco et al. |
| 8,806,882 B2 | 8/2014 | Bennion et al. |
| 8,839,632 B2 | 9/2014 | Goenka et al. |
| 8,915,091 B2 | 12/2014 | Goenka |
| 8,955,578 B2 | 2/2015 | Kwon et al. |
| 8,974,942 B2 | 3/2015 | Bell et al. |
| 9,038,400 B2 | 5/2015 | Goenka |
| 9,103,573 B2 | 8/2015 | Goenka et al. |
| 9,310,112 B2 | 4/2016 | Bell et al. |
| 9,365,090 B2 | 6/2016 | Gawthrop et al. |
| 9,366,461 B2 | 6/2016 | Bell et al. |
| 9,445,524 B2 | 9/2016 | Lofy et al. |
| 9,447,994 B2 | 9/2016 | Barnhart et al. |
| 9,451,723 B2 | 9/2016 | Lofy et al. |
| 9,555,686 B2 | 1/2017 | Ranalli et al. |
| 9,719,701 B2 | 8/2017 | Bell et al. |
| 9,861,006 B2 | 1/2018 | Lofy et al. |
| 9,863,672 B2 | 1/2018 | Goenka |
| 10,106,011 B2 | 10/2018 | Goenka |
| 10,219,407 B2 | 2/2019 | Lofy et al. |
| 10,455,728 B2 | 10/2019 | Lofy et al. |
| 10,464,391 B2 | 11/2019 | Bell et al. |
| 2002/0014330 A1 | 2/2002 | Guyonvarch |
| 2002/0173264 A1 | 11/2002 | Ottman et al. |
| 2003/0140636 A1 | 7/2003 | Van Winkle |
| 2003/0159455 A1 | 8/2003 | Aikawa et al. |
| 2004/0025516 A1 | 2/2004 | Van Winkle |
| 2004/0098991 A1 | 5/2004 | Heyes |
| 2004/0163395 A1 | 8/2004 | Ichishi et al. |
| 2004/0237541 A1 | 12/2004 | Murphy |
| 2005/0061497 A1 | 3/2005 | Amaral |
| 2005/0087333 A1 | 4/2005 | Horn et al. |
| 2005/0139692 A1 | 6/2005 | Yamamoto |
| 2005/0161193 A1* | 7/2005 | McKenzie ............ B60N 2/5678 165/73 |
| 2005/0204768 A1 | 9/2005 | Di Vito et al. |
| 2005/0229629 A1 | 10/2005 | Burk et al. |
| 2005/0257545 A1 | 11/2005 | Ziehr et al. |
| 2005/0278863 A1 | 12/2005 | Bahash et al. |
| 2006/0000592 A1 | 1/2006 | Bosquet et al. |
| 2006/0005548 A1 | 1/2006 | Ruckstuhl |
| 2006/0011152 A1 | 1/2006 | Hayes |
| 2006/0016203 A1* | 1/2006 | Hayashi ............ F25B 31/004 62/228.3 |
| 2006/0059933 A1 | 3/2006 | Axakov et al. |
| 2006/0075758 A1 | 4/2006 | Rice et al. |
| 2006/0102335 A1 | 5/2006 | Fujiki et al. |
| 2006/0137359 A1 | 6/2006 | Ghoshal |
| 2006/0137360 A1 | 6/2006 | Ghoshal |
| 2006/0137853 A1 | 6/2006 | Haller et al. |

(56) References Cited

U.S. PATENT DOCUMENTS

| | | |
|---|---|---|
| 2006/0150657 A1 | 7/2006 | Spurgeon et al. |
| 2006/0174633 A1 | 8/2006 | Beckley |
| 2006/0188418 A1 | 8/2006 | Park et al. |
| 2006/0254284 A1 | 11/2006 | Ito et al. |
| 2007/0000255 A1 | 1/2007 | Elliot et al. |
| 2007/0034356 A1 | 2/2007 | Kenny et al. |
| 2007/0056295 A1 | 3/2007 | De Vilbiss |
| 2007/0101737 A1 | 5/2007 | Akei et al. |
| 2007/0157630 A1 | 7/2007 | Kadle et al. |
| 2007/0272290 A1 | 11/2007 | Sims et al. |
| 2008/0223064 A1 | 9/2008 | Feuerecker et al. |
| 2009/0020620 A1 | 1/2009 | Douarre |
| 2009/0032080 A1 | 2/2009 | Kawauchi et al. |
| 2009/0118869 A1 | 5/2009 | Cauchy et al. |
| 2009/0250980 A1* | 10/2009 | Major .................. B60N 2/5635 297/180.15 |
| 2010/0031987 A1 | 2/2010 | Bell et al. |
| 2010/0052374 A1* | 3/2010 | Bell .................. B60H 1/00492 297/180.12 |
| 2010/0101239 A1 | 4/2010 | LaGrandeur et al. |
| 2010/0155018 A1 | 6/2010 | Goenka et al. |
| 2010/0293966 A1 | 11/2010 | Yokomachi et al. |
| 2011/0061403 A1* | 3/2011 | Jun ...................... B60N 2/5692 62/3.61 |
| 2011/0107773 A1 | 5/2011 | Gawthrop |
| 2011/0114739 A1* | 5/2011 | Misumi .............. B60H 1/00742 236/49.3 |
| 2011/0120146 A1 | 5/2011 | Ota et al. |
| 2011/0139397 A1 | 6/2011 | Haussmann |
| 2011/0164652 A1 | 7/2011 | ReFalo et al. |
| 2011/0165830 A1* | 7/2011 | Smith ................ B60H 1/00278 454/75 |
| 2011/0284202 A1 | 11/2011 | Hirai et al. |
| 2012/0202413 A1 | 8/2012 | Kawashima |
| 2012/0266608 A1 | 10/2012 | Kadle et al. |
| 2013/0068440 A1* | 3/2013 | Kamiyama ........ B60H 1/00878 165/202 |
| 2013/0192272 A1 | 8/2013 | Ranalli et al. |
| 2013/0206382 A1 | 8/2013 | Ichishi et al. |
| 2013/0232996 A1* | 9/2013 | Goenka .................... B60N 2/56 62/3.61 |
| 2013/0239592 A1 | 9/2013 | Lofy |
| 2013/0299128 A1 | 11/2013 | Bergamini |
| 2013/0317728 A1 | 11/2013 | Hall et al. |
| 2014/0173946 A1* | 6/2014 | Gerrits ...................... E02F 9/18 37/248 |
| 2014/0213168 A1 | 7/2014 | Goenka et al. |
| 2014/0250918 A1 | 9/2014 | Lofy |
| 2014/0338366 A1 | 11/2014 | Adldinger et al. |
| 2014/0338882 A1 | 11/2014 | Rollinson et al. |
| 2015/0375597 A1* | 12/2015 | Callahan .............. F24F 5/0042 62/3.61 |
| 2016/0355067 A1 | 12/2016 | Barnhart et al. |
| 2016/0361967 A1 | 12/2016 | Gawthrop |
| 2017/0259643 A1 | 9/2017 | Ranalli et al. |
| 2017/0328612 A1 | 11/2017 | Lofy |
| 2017/0361676 A1* | 12/2017 | Androulakis ........ B60N 2/5685 |
| 2018/0001734 A1 | 1/2018 | Faust et al. |
| 2018/0195777 A1 | 7/2018 | Goenka |
| 2018/0251008 A1 | 9/2018 | Androulakis et al. |
| 2019/0152292 A1 | 5/2019 | Goenka |
| 2019/0261535 A1 | 8/2019 | Lofy et al. |
| 2020/0047654 A1 | 2/2020 | Pine et al. |

FOREIGN PATENT DOCUMENTS

| | | |
|---|---|---|
| CN | 1195090 | 10/1998 |
| CN | 2813357 | 9/2006 |
| CN | 2827781 | 10/2006 |
| CN | 101508236 | 8/2009 |
| CN | 101720414 | 6/2010 |
| CN | 102328569 | 1/2012 |
| CN | 202174959 | 3/2012 |
| CN | 202200804 | 4/2012 |
| CN | 102555870 | 7/2012 |
| CN | 103438629 | 12/2013 |
| DE | 1 301 454 | 8/1969 |
| DE | 2 220 009 | 11/1973 |
| DE | 2319155 | 10/1974 |
| DE | 4 238 364 | 5/1994 |
| DE | 196 45 544 | 5/1998 |
| DE | 197 30 678 | 1/1999 |
| DE | 299 04 238 | 6/1999 |
| DE | 198 29 440 | 1/2000 |
| DE | 199 51 224 | 5/2001 |
| DE | 201 05 487 | 10/2001 |
| DE | 102 37 420 | 9/2003 |
| DE | 103 37 889 | 12/2004 |
| DE | 20 2005 013 039 | 11/2005 |
| DE | 10 2006 001 304 | 7/2007 |
| DE | 10 2010 052 019 | 6/2011 |
| DE | 10 2009 003 737 | 12/2012 |
| EP | 0 206 151 | 12/1986 |
| EP | 0 389 407 | 9/1990 |
| EP | 0 545 021 | 6/1993 |
| EP | 0 791 497 | 8/1997 |
| EP | 0 834 421 | 4/1998 |
| EP | 1 038 701 | 9/2000 |
| EP | 1 462 281 | 9/2004 |
| EP | 1 088 696 | 11/2005 |
| EP | 1 932 695 | 6/2008 |
| FR | 2 419 479 | 10/1979 |
| FR | 2 806 666 | 9/2001 |
| FR | 2 907 064 | 4/2008 |
| GB | 231 192 A | 5/1926 |
| GB | 1 040 485 | 8/1966 |
| GB | 2 267 338 | 12/1993 |
| GB | 2 278 432 | 11/1994 |
| GB | 2 333 352 | 7/1999 |
| GB | 2 440 312 | 1/2008 |
| JP | 39-027735 | 12/1964 |
| JP | 56-018231 | 2/1981 |
| JP | 62-191212 | 8/1987 |
| JP | 01-131830 | 5/1989 |
| JP | 01-200122 | 8/1989 |
| JP | 01-281344 | 11/1989 |
| JP | 04-103925 | 4/1992 |
| JP | 04-165234 | 6/1992 |
| JP | 05-037521 U | 5/1993 |
| JP | 05-278451 | 10/1993 |
| JP | 06-024235 | 2/1994 |
| JP | 06-135218 | 5/1994 |
| JP | 07-089334 | 4/1995 |
| JP | 07-054189 | 6/1995 |
| JP | 07-253224 | 10/1995 |
| JP | 08-197937 | 8/1996 |
| JP | 08-316388 | 11/1996 |
| JP | 09-042801 | 2/1997 |
| JP | 09-092761 | 4/1997 |
| JP | 09-254630 | 9/1997 |
| JP | 09-276076 | 10/1997 |
| JP | 10-035268 | 2/1998 |
| JP | 11-042933 | 2/1999 |
| JP | 11-129735 | 5/1999 |
| JP | 11-301254 | 11/1999 |
| JP | 11-342731 | 12/1999 |
| JP | 2000-130883 | 5/2000 |
| JP | 2000-142095 | 5/2000 |
| JP | 2000-161721 | 6/2000 |
| JP | 2000-185542 | 7/2000 |
| JP | 2000-274788 | 10/2000 |
| JP | 2000-274871 | 10/2000 |
| JP | 2000-274874 | 10/2000 |
| JP | 2000-289451 | 10/2000 |
| JP | 2000-318434 | 11/2000 |
| JP | 2000-335230 | 12/2000 |
| JP | 2001-206053 | 7/2001 |
| JP | 2001-227840 | 8/2001 |
| JP | 2002-13758 | 1/2002 |
| JP | 2002-059736 | 2/2002 |
| JP | 2002-232028 | 8/2002 |
| JP | 2003-237357 | 8/2003 |
| JP | 2004-050874 | 2/2004 |

(56) References Cited

FOREIGN PATENT DOCUMENTS

| | | |
|---|---|---|
| JP | 2005-212564 | 8/2005 |
| JP | 2005-219700 | 8/2005 |
| JP | 2005-269738 | 9/2005 |
| JP | 2005-302851 | 10/2005 |
| JP | 2006-001530 | 1/2006 |
| JP | 2006-015965 | 1/2006 |
| JP | 2006-168463 | 6/2006 |
| JP | 2007-161110 | 6/2007 |
| JP | 2007-253947 | 10/2007 |
| JP | 2008-094366 | 4/2008 |
| JP | 2010-125997 | 6/2010 |
| JP | 2010-240045 | 10/2010 |
| JP | 2011-001048 | 1/2011 |
| JP | 2011-131871 | 7/2011 |
| JP | 2011-152855 | 8/2011 |
| JP | 2012-011928 | 1/2012 |
| KR | 1997-0000845 | 1/1997 |
| KR | 1998-0022458 | 7/1998 |
| KR | 1998-0040187 | 9/1998 |
| KR | 10-0189462 | 6/1999 |
| KR | 2001-111646 | 12/2001 |
| KR | 10-2002-0057600 | 7/2002 |
| KR | 10-2003-0082589 | 10/2003 |
| KR | 10-0503239 | 7/2005 |
| KR | 10-2007-0077546 | 7/2007 |
| KR | 10-0756937 | 9/2007 |
| KR | 10-2008-0010646 | 1/2008 |
| KR | 2008-0008875 | 1/2008 |
| KR | 10-2011-0013876 | 2/2011 |
| KR | 2011-0011230 | 12/2011 |
| KR | 2012-0041861 | 5/2012 |
| KR | 2012-0088042 | 8/2012 |
| LU | 66619 | 2/1973 |
| SE | 337 227 | 5/1971 |
| SU | 184886 | 7/1966 |
| SU | 1196627 | 12/1985 |
| WO | WO 94/020801 | 9/1994 |
| WO | WO 95/01500 | 1/1995 |
| WO | WO 95/014899 | 6/1995 |
| WO | WO 96/05475 | 2/1996 |
| WO | WO 97/47930 | 12/1997 |
| WO | WO 98/15420 | 4/1998 |
| WO | WO 99/09360 | 2/1999 |
| WO | WO 99/10191 | 3/1999 |
| WO | WO 99/58907 | 11/1999 |
| WO | WO 00/12948 | 3/2000 |
| WO | WO 02/00458 | 1/2002 |
| WO | WO 03/014634 | 2/2003 |
| WO | WO 2004/027328 | 4/2004 |
| WO | WO 2005/023571 | 3/2005 |
| WO | WO 2005/063567 | 7/2005 |
| WO | WO 2006/037178 | 4/2006 |
| WO | WO 2006/064432 | 6/2006 |
| WO | WO 2007/001289 | 1/2007 |
| WO | WO 2007/021273 | 2/2007 |
| WO | WO 2007/097059 | 8/2007 |
| WO | WO 2008/013946 | 1/2008 |
| WO | WO 2008/072251 | 6/2008 |
| WO | WO 2008/091293 | 7/2008 |
| WO | WO 2008/123663 | 10/2008 |
| WO | WO 2008/147305 | 12/2008 |
| WO | WO 2010/008158 | 1/2010 |
| WO | WO 2010/135363 | 11/2010 |
| WO | WO 2013/151903 | 10/2013 |
| WO | WO 2014/065702 | 5/2014 |
| WO | WO 2016/100697 | 6/2016 |
| WO | WO 2017/065847 | 4/2017 |

OTHER PUBLICATIONS

U.S. Appl. No. 15/694,467, filed Sep. 1, 2017, Adldinger et al.
Bell, L.E., "Alternate Thermoelectric Thermodynamic Cycles with Improved Power Generation Efficiencies" Thermoelectrics, 2003 Twenty-Second International Conference on—ICT LA Grande Motte, France Aug. 17-21, 2003, Piscataway, NJ, USA, IEEE, Aug. 17, 2003 (Aug. 17, 2003), pp. 558~562, XP010697375, ISBN: 0-7803-8301-X.
Diller, R. W., et al., "Experimental Results Confirming Improved Performance of Systems Using Thermal Isolation", 21st International Conference on Thermoelectronics, Aug. 25-29, 2002, Piscataway, NJ, USA, IEEE, pp. 548-550, XP010637541 ISBN: 0-7803-7683-8.
Heckenberger, Thomas, "Li-on Battery Cooling," BEHR Power Point Presentation, Technical Press Day, Stuttgart, May 20, 2009, 13 pages.
International Search Report and Written Opinion re Application No. PCT/US2015/066432, dated Apr. 1, 2016.
International Preliminary Report on Patentability re PCT Application No. PCT/US2015/066432, dated Jun. 29, 2017.
International Search Report and Written Opinion re PCT Application No. PCT/US2016/038566, dated Sep. 29, 2016.
Japanese Office Action re JP Patent Application No. 2006-305938, dated Jul. 21, 2009.
Lofy, J., et al., "Thermoelectrics for Environmental Control in Automobiles", Proceeding of Twenty-First International Conference on Thermoelectrics (ICT 2002), 2002, pp. 471-476.
Stockholm, John G., "Large-Scale Cooling: Integrated Thermoelectric Element Technology," CRC Handbook of Thermoelectrics, Chapter 53, pp. 657-666. 0-8493-0146, Jul. 1995.

* cited by examiner

THERMAL CONDITIONING SYSTEMS AND METHODS FOR VEHICLE REGIONS

CROSS-REFERENCE TO RELATED APPLICATIONS

This application is a continuation of U.S. patent application Ser. No. 15/536,407, filed Jun. 15, 2017, which is a U.S. National Phase Application of PCT International Application Number PCT/US2015/066432, filed Dec. 17, 2015, designating the United States of America and published in the English language, which claims the benefit of priority to U.S. Provisional Patent Application No. 62/094,852, filed Dec. 19, 2014, and to U.S. Provisional Patent Application No. 62/241,514, filed Oct. 14, 2015, the entire disclosure of each of which is expressly incorporated by reference herein in its entirety for all purposes and forms a part of this specification.

BACKGROUND

Field

This disclosure relates generally to thermal systems, in particular to vapor compression systems for heating and cooling components of a vehicle.

Description of the Related Art

Thermal conditioning, i.e. heating and/or cooling, of components in vehicles is desirable in many situations. In the cold climates, it is desirable to have a warmed seat. In hot climates, it is desirable to have cup holders that keep drinks cool. Various approaches to thermally conditioning components within a vehicle are known One approach uses the vehicle's radiator to provide thermal conditioning to components in the vehicle. This approach requires complex configurations to route the thermal medium, such as air or liquid, to the various components within the interior of the vehicle. Other approaches use thermal electric devices that are dedicated to a target device for conditioning. However, such devices have a limited power output and multiple devices may be required to meet power requirements. Another approach uses large compressors that are dedicated to the component they are conditioning. For example, some vehicles use a large compressor that is dedicated to a single component and cools it by conduction. Such systems are bulky and are limited to servicing a single component. Further, such large compressors are noisy and must be acoustically isolated, such as with sound proofing.

There is a need for systems for thermally conditioning vehicle components that overcome the drawbacks of conventional approaches. Several embodiments of a system for thermally conditioning various components in a vehicle are described herein. The system is configured to service the various components independently, at varying temperatures and power demands, in cooperation with one or more similar or different convective and conductive conditioners. The thermally conditioned components may be a seat, and thermal convenience components such as a storage bin, a cup holder, or may be other components in a vehicle. The system includes a thermal bus having, in some embodiments, a single main line for circulating a thermal medium, which may be a liquid or gas.

The thermal medium can be heated or cooled by a vapor compression system that has a miniature compressor, an evaporator and a condenser. The miniature compressor may be any of a number of commercially available miniature compressors, and it may be reciprocating, rotary screw, centrifugal, scroll, or others. In some embodiments, the miniature compressor may have an output from about 100-300 watts. In some embodiments, the miniature compressor may have an output of about 100 watts. The miniature compression system can be relatively miniature, small, micro, or compact to fit into a desired/predetermined location, area, or compartment of a vehicle, such as for example, a center console, dashboard, under a seat, etc. of the vehicle. In some embodiments, the miniature compressor has a size comparable to a twelve ounce soda can.

The vapor compression system is in thermal communication with one or more thermal regions within the vehicle. The miniature compressor may have variable speed control to vary the thermal energy provided to the thermal medium from the miniature vapor compression system. For providing cooling, the evaporator of the vapor compression system is in thermal communication with the thermal regions. For providing heating, the condenser of the vapor compression system is in thermal communication with the thermal regions. The thermal regions may each include a heat transfer device (e.g., a heat exchanger) and the component to be heated or cooled. Branches from the main line service the various regions and are configured to circulate the thermal medium from a main line to the heat exchangers. The branches may each include a flow control device, such as a valve or pump, configured to regulate the flow of the thermal medium through the branch and thereby control the temperature of the heat exchanger.

The thermal regions may include a fan (e.g., a fluid moving device such a fluid flow control device, including a pump) configured to blow air over the heat exchanger in either an "open loop air" system, where conditioned air is emitted from the component, or in a "closed loop air" system where the conditioned air is recirculated through the thermal region. The thermal regions may also be conductive regions where the heat exchanger and the component contact each other such that the component is thermally conditioned via conduction (e.g. the heat exchanger, such as for example a plate, is in substantially direct thermal communication with the conditioned component). The system may also include a thermal battery coupled with the main line that provides thermal conditioning when the vapor compression system is not operating. These are merely some aspects of the disclosure, and further aspects and details are provided herein.

Various embodiments of this disclosure relate to a thermal conditioning system for heating or cooling within a thermal zone of a vehicle. The system can include the following a fluid circuit configured to circulate a first working fluid in the fluid circuit, a thermal energy source in thermal communication with the fluid circuit, the thermal energy source configured to heat or cool the first working fluid, a first conduit in fluid communication with the fluid circuit, the first conduit configured to convey at least some of the first working fluid in the first conduit; a first heat transfer device in thermal communication with the first conduit; a first component within the thermal zone of the vehicle, the first component in thermal communication with the first heat transfer device, wherein the first heat transfer device heats or cools the first component via thermal energy transferred from or to the at least some of the first working fluid in the first conduit, a second conduit in fluid communication with the fluid circuit, the second conduit configured to convey at least some of the first working fluid in the second conduit, a second heat transfer device in thermal communication with the second conduit; and a second component within the thermal zone of the vehicle, the second component in thermal communication with the second heat transfer device, wherein the second near transfer device heats or cools the second component via thermal energy transferred from or to the at least some of the first working fluid in the third conduit.

In some embodiments, the thermal conditioning system can include one or more of the following: a third conduit in thermal communication with the first heat transfer device and the first component, wherein the first heat transfer device transfers thermal energy between the first conduit and the third conduit; the third conduit is configured to convey a second working fluid in the third conduit that is different than the first working fluid, the second working fluid heated or cooled via thermal energy transferred from or to the first working fluid in the first conduit by the first heat transfer device; the first working fluid comprises a liquid and the second working fluid includes air; a fan configured to move the air in the third conduit; the fan blows air toward the first component without recirculating the air to heat or cool the first component; the first component comprises a first one of a seat, a cup holder, and a bin of the vehicle; the third conduit is configured to recirculate the air in the third conduit, the fan moves the air in the second conduit to heat or cool the first component; the first component includes an enclosure; the third conduit is configured to recirculate the air between the enclosure and the first heat transfer device; the first component comprises an enclosure, and the third conduit is configured to recirculate the air within the enclosure; the second conduit includes a duct connected to a wall of the enclosure; the duct includes a first opening to draw the air from the enclosure and a second opening to direct air into the enclosure; the fan is positioned at the first opening or the second opening; the second heat transfer device includes a conductive plate having a first surface configured to thermally connect to a second surface of the second component to form the substantially direct thermal communication; the second component includes a cup holder of the vehicle; the thermal conditioning system includes a thermal battery and a fourth conduit in fluid communication with the fluid circuit, the fourth conduit is configured to convey the first working fluid in the fourth conduit, the fourth conduit in thermal communication with the thermal battery, the thermal buttery is configured to store thermal energy while the vehicle is operating and configured to release thermal energy when the vehicle is not operating, the thermal energy source includes a vapor compression system; the fluid circuit is in thermal communication with an evaporator of the vapor compression system to cool the first working fluid, the fluid circuit is in thermal communication with a condenser of the vapor compression system to heat the first working fluid; the fluid circuit is in thermal communication selectively with either an evaporator of the vapor compression system or a condenser of the vapor compression system to cool or heat, respectively, the first working fluid; the evaporator or the condenser of the vapor compression system is positioned within a passenger compartment of the vehicle; the vapor compression system is positioned within the thermal zone of the vehicle; the thermal zone is contained within a passenger compartment of the vehicle; the thermal zone is smaller than the passenger compartment of the vehicle; a plurality of the thermal conditioning systems is provided; the plurality of thermal conditioning systems positioned within a passenger compartment of the vehicle; the thermal conditioning system includes an other thermal energy source in selective thermal communication with the fluid circuit, the other thermal energy source includes a heat source configured to heat the first working fluid; the thermal conditioning system includes an other thermal energy source in selective thermal communication with the first conduit, the other thermal energy source includes a heat source configured to heat the first working fluid in the first conduit to heat the first component; the second component is in substantially direct thermal communication with the second heat transfer device; the thermal conditioning system includes one or more temperature sensors configured to determine a temperature of at least one of the first component or the second component; the system is configured to heat or cool the at least one of the first component or the second component to a predetermined temperature; the thermal conditioning system includes one or more temperature sensors configured to determine a temperature of at least one of the first heat transfer device or the second heat transfer device; the system is configured to heat or cool the at least one of the first heat transfer device or the second heat transfer device to a predetermined temperature; the thermal conditioning system includes a temperature sensor configured to determine a temperature of the first working fluid; the system is configured to heat or cool the first working fluid to a predetermined temperature: and/or the second component comprises a second one of a seat, a cup holder, and a bin of the vehicle different than the first one of a seat, a cup holder, and a bin of the vehicle.

Various embodiments of this disclosure relate to a system for thermally conditioning a component in a vehicle having a central heating, ventilation and air conditioning (HVAC) system. The system can include the following: a thermal bus and a vapor compression system in thermal communication with the thermal bus. The thermal bus can include the following a main line configured to circulate a thermal medium therethrough: a thermal region including a first heat exchanger and the component; and a first branch coupled with the main line and configured to circulate at least some of the thermal medium from the mam line to the thermal region, a second thermal region including a second heat exchanger and a second component; and a second branch coupled with the main line and configured to circulate at least some of the thermal medium from the main line to the second thermal region. The vapor compression system is separate from the central HVAC system and can include the following: a miniature compressor; a condenser coupled with the compressor; and an evaporator coupled with the condenser and the compressor, wherein the miniature vapor compression system provides thermal energy to the thermal medium circulating in the main line of the thermal bus.

In some embodiments, the system for thermally conditioning a component can include one or more of the following. The thermal bus including the following: a second thermal region including a second heat exchanger and a second component, a second branch coupled with the main line and configured to circulate the thermal medium from the main line to the second thermal region; the thermal bus includes a third thermal region including a third heat exchanger and a third component; a third branch coupled with the main line and configured to circulate the thermal medium from the main line to the third thermal region; the first and second components are two of a seat, a bin, and a cup holder, the first component is a seat, the second component is a bin; the third component is a cup holder, the system for thermally conditioning a component includes the vehicle; the thermal bus and the miniature vapor compression system are installed in the vehicle, the miniature compressor has a variable speed to vary the thermal energy provided to the thermal medium from the miniature vapor compression system; the first branch includes a valve, and the first branch circulates the thermal medium adjacent to the heat exchanger and the valve is configured to regulate the flow of the thermal medium therethrough and thereby control the temperature or other heat transfer properties of the heat exchanger; the thermal medium is a liquid; the thermal region includes a fan configured to blow air over the heat exchanger; the thermal region is an open loop air system configured to emit conditioned air therefrom; the thermal region includes a fan configured to blow air over the heat exchanger; the thermal region is a closed loop air system configured to recirculate conditioned air; the heat exchanger and the component contact each other such that the component is thermally conditioned via conduction; the condenser is configured to integrate with the vehicle air conditioning system; and/or the system for thermally conditioning a component includes a thermal battery coupled with the main line.

Various embodiments of the disclosure relate to a thermal conditioning system for heating or cooling within a thermal zone of a vehicle. The system can include the following a first fluid circuit of a vapor compression system, and the first fluid circuit can be configured to circulate a first working fluid in the first fluid circuit; a first heat transfer device in thermal communication with the first fluid circuit, the vapor compression configured to heat or cool the first heat transfer device via the first working fluid in the first fluid circuit; a second fluid circuit configured to circulate a second working fluid in the second fluid circuit, the second fluid circuit in thermal communication with the first heat transfer device to heat or cool the second working fluid via thermal energy transferred from or to the first working fluid; a first conduit in fluid communication with the second fluid circuit, the first conduit configured to convey the second working fluid in the first conduit; a second heat transfer device in thermal communication with the first conduit; a second conduit in thermal communication with the second heat transfer device, wherein the second heat transfer device transfers thermal energy between the first conduit and the second conduit; a first component within the thermal zone of the vehicle, the first component in thermal communication with the second conduit, wherein the second conduit heats or cools the first component via thermal energy transferred from or to the second working fluid in the first conduit by the second heat transfer device, a third conduit in fluid communication with the second fluid circuit, the third conduit configured to convey the second working fluid in the third conduit; a third heat transfer device in thermal communication with the third conduit; and a second component within the thermal zone of the vehicle, the second component in substantially direct thermal communication with the third heat transfer device, and the third heat transfer device can heat or cool the second component by transferring thermal energy between the second working fluid in the third conduit and the second component.

In some embodiments, the thermal conditioning system for heating or cooling within a thermal zone of a vehicle can include one or more of the following. The first working fluid includes refrigerant of the vapor compression system, the second working fluid includes ethylene glycol; the first heat transfer device includes a condenser or an evaporator of the vapor compression system; the condenser or the evaporator is configured to heat or cool, respectively, the second working fluid via the first heat transfer device; the vapor compression system is operated reversibly for the first heat transfer device to perform as either the condenser or the evaporator; the system includes a fourth heat transfer device in thermal communication with the second fluid circuit; the fourth heat transfer device is in thermal communication with the first heat transfer device to transfer thermal energy between the first and second working fluids; the fourth heat transfer device includes a conductive plate in substantially direct thermal communication with the first heat transfer device; the second conduit is configured to convey a third working fluid in the second conduit; the third working fluid is heated or cooled via thermal energy transferred from or to the second working fluid in the first conduit by the second heat transfer device; the third working fluid includes air; the system includes a fan configured to move the air in the second conduit, the fan blows air toward the first component without recirculating the air to heat or cool the first component; the first component includes a seat of the vehicle; the second conduit is configured to recirculate the air in the second conduit; the fan moves the air in the second conduit to heat or cool the first component; the first component includes an enclosure; the second conduit is configured to recirculate the air within the enclosure; the second conduit includes a duct connected to a wall of the enclosure; the duct includes a first opening to draw the air from the enclosure and a second opening to direct air back into the enclosure; the fan is positioned at the first opening or the second opening; the third heat transfer device includes a conductive plate having a first surface configured to thermally connect to a second surface of the second component to form the substantially direct thermal communication; the second component includes a cup holder of the vehicle; the system includes a thermal battery and a fourth conduit in fluid communication with the second fluid circuit; the fourth conduit is configured to convey the second working fluid in the fourth conduit; the fourth conduit is in thermal communication with the thermal battery; the thermal battery is configured to store thermal energy while the vehicle is operating and configured to release thermal energy when the vehicle is not operating; the evaporator or the condenser of the vapor compression system is positioned within a passenger compartment of the vehicle; the thermal zone is contained within a passenger compartment of the vehicle; the thermal zone is smaller than the passenger compartment of the vehicle; a plurality of the thermal conditioning systems are provided; the plurality of the thermal conditioning systems are positioned within a passenger compartment of the vehicle; the system or systems include a thermal energy source in selective thermal communication with the second fluid circuit; the thermal energy source includes a heat source configured to heat the second working fluid; the system or systems include a thermal energy source in selective thermal communication with the first conduit; the thermal energy source includes a heat source configured to heat the second working fluid in the first conduit to heat the first component; the system or systems include one or more temperature sensors configured to determine a temperature of at least one of the first component or the second component; the system is configured to heat or cool the at least one of the first component or the second component to a predetermined temperature; the system or systems include one or more temperature sensors configured to determine a temperature of at least one of the second heat transfer device or the third heat transfer device; the system or systems are configured to heat or cool the at least one of the second heat transfer device or the third heat transfer device to a predetermined temperature; and/or the system or systems include a temperature sensor configured to determine a temperature of the second working fluid, and the system or systems are is configured to heat or cool the second working fluid to a predetermined temperature.

The foregoing is a summary and contains simplifications, generalization, and omissions of detail. Those skilled in the art will appreciate that the summary is illustrative only and is not intended to be in any way limning. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

The summary is provided to introduce a selection of concepts in a simplified form that are further described below in the Detailed Description. This summary is not intended to identify key features or essential features of any subject matter described herein.

BRIEF DESCRIPTION OF THE DRAWINGS

Non-limiting and non-exhaustive embodiments will be described with reference to the following figures, wherein like reference numerals refer to like parts throughout the various figures, unless otherwise specified.

DETAILED DESCRIPTION

Figure 1A:
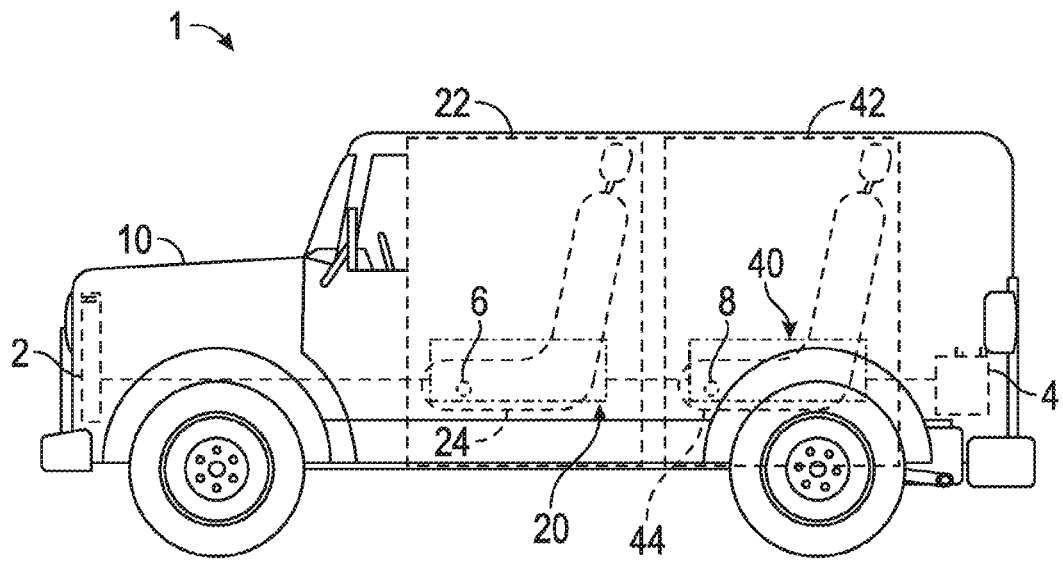
FIG. 1A is a side view of an embodiment of a system for thermally servicing a vehicle having thermal systems that service various components in various thermal zones of the vehicle.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily ail referring to the same embodiment. Furthermore, the particular features, structures, or characteristics may be combined in one or more embodiments (e.g., some embodiments).

The systems and methods disclosed herein provide features for thermally conditioning components in a vehicle using a vapor compressor. Although presented in the context of a vehicle, similar systems may be used in other contexts as well, such as homes and offices. The system includes at least one legion having one or more components serviced by a thermal energy source that uses, for example, a vapor compressor. In some embodiments, the system has two, three, or more regions with each region having several components that are thermally conditioned. The system can include a single fluid loop for servicing the one or more regions and the components therein. In some embodiments, the single loop circulates liquid thermal medium conditioned by a vapor compression system as the thermal energy source, e.g., a miniature vapor compressor, to each of the one or more regions. The liquid medium branches off of the loop to each region. Each region can include a heat transfer device (e.g., a heat exchanger) that transfers heat to or from the various components. For example, a first region may have a seat, a second region may have a storage bin in a center console, and a third region may have a cup holder. The single, liquid medium loop can service all three regions. Further, each region may thermally condition their respective components with a variety of mechanisms, including "open loop air," "closed loop air," conductive, or other types, including fluid thermal system with circuits and conduits conveying, for example, liquid. The conditioning may be controlled, such that the components are heated or cooled to a predetermined temperature. In some embodiments, the conditioning systems disclosed herein may be controlled using the various methods and techniques disclosed in U.S. provisional patent application No. 62/241, 514, filed Oct. 14, 2015, the entire contents of which are incorporated herein by reference.

As used herein, the term "lines," "loops" and similar terms and phrases are used in their broad and/ordinary sense and include, for example, any suitable piping, tubes, circuits, conduits, channels, passageways, etc. for conveying and/or directing a desired medium or fluid (e.g., liquid, gas, coolant, air) As used herein, the term "coolant" and similar terms and phrases are used in their broad and/ordinary sense and include, for example, fluids such as refrigerant or glycol that transfer thermal energy within a heating or cooling system. As used herein, the term "heat transfer device" or "heat exchanger" and similar terms and phrases are used in their broad and/ordinary sense and include, for example, a heat exchanger, a heat transfer surface, a heat transfer structure, heat exchanger fins, and other suitable apparatuses for transferring thermal energy between media, or any combination of such devices. As used herein, the terms "thermal energy source," and "heat source" and similar terms and phrases are used in their broad and/ordinary sense and include, for example, a condenser, a vehicle engine, a burner, an electronic component, a heating element, a battery or battery pack, an exhaust system component, a device that converts energy into thermal energy, or any combination of such devices. In some embodiments, the terms "thermal energy source" and "heat source" can refer to a negative thermal energy source, such as, for example, a chiller, an evaporator, another cooling component, a combination of components, and so forth.

As used herein, the terms "sufficient" and "sufficiently," and similar terms and phrases, are used broadly in accordance with their ordinary meanings. For example, in the context of sufficient heating or sufficient heat transfer involving a fluid, these terms broadly encompass, without limitation, a condition in which the fluid, component, or a region is heated to a temperature that is predetermined or desired by a user such as, for example, a passenger of a vehicle or a condition in which the fluid, component, or a region is heated to a threshold temperature.

As used herein, the terms "actuator" or "fluid flow control device" and similar terms and phrases are used broadly in accordance with their ordinary meaning. For example, the terms broadly encompass fluid control devices, such as, for example, valves, regulators, pumps, and other suitable structures or combination of structures used to control the flow of fluids.

As used herein, the term "control device" and similar terms and phrases are used broadly in accordance with their ordinary meaning. For example, such terms and phrases broadly encompass a device or system that is configured to control fluid movement, electrical energy transfer, thermal energy transfer, and/or data communications among one or more components. The control device may include a single controller that controls one or more components of the system, or it may include more than one controller controlling various components of the system.

Figure 1B:
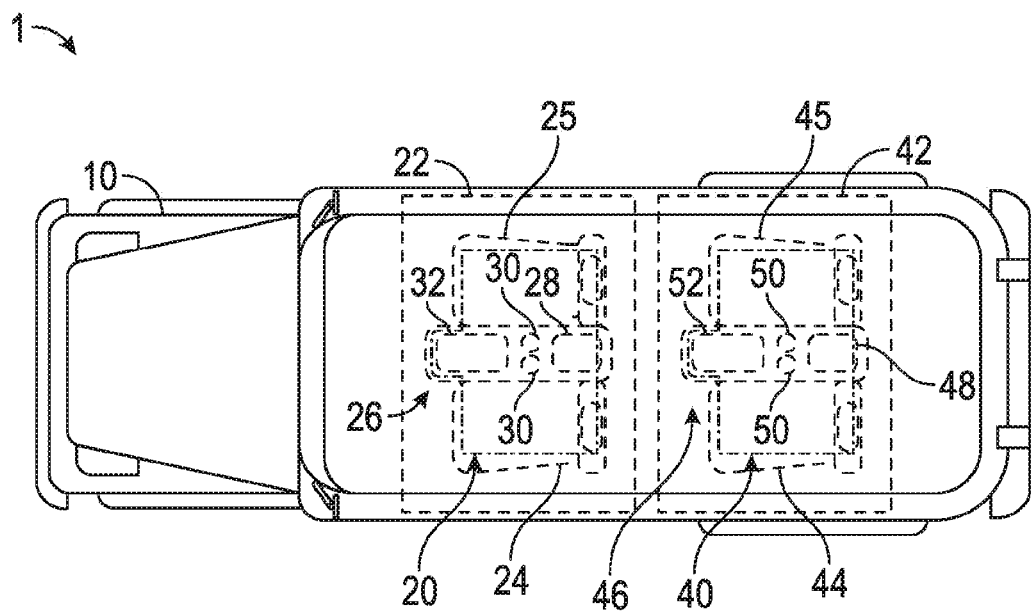
FIG. 1B is a top view of the system of FIG. 1A.

FIGS. 1A-1B illustrate an embodiment of a system 1 for thermally servicing a vehicle 10 having thermal buses 20, 40 that service various components in various thermal zones 22, 42 of the vehicle 10. The vehicle 10 may Ire a passenger car, truck, sport utility vehicle, semi-truck, limousine, mobile agricultural or construction vehicle, or any other suitable vehicle. The vehicle 10 may be propelled by a combustion engine, an electric motor, or combination thereof. The system 1 may be operated during periods the vehicle 10 is operated (e.g. moving) and/or when the vehicle 10 is not operated (e.g. stationary) During periods when the vehicle 10 is not operated, the system 1 can be powered by a vehicle power source such as an onboard battery or a generator powered by a combustion engine or an electric motor. In this way, the system 1 can provide an engine off thermal management system, for example for a cabin, bed, refrigerator or other region of a commercial or over-the-highway truck.

The system 1 includes a first thermal bus 20 located in a first thermal zone 22 of the vehicle 10. The first thermal bus 20 is a system for servicing components loaned within the first thermal zone 22. As shown, components in the first thermal zone 22 include a first front seat 24 and at least part of a front row seating area within a front passenger compartment of the vehicle 10. The front passenger compartment may be a location of the vehicle 10 where a driver sits and drives the vehicle 10 or where a front row passenger sits and rides along. The bus 20, zone 22 and seat 24 are shown in dashed lines because they are inside the vehicle 10. The first thermal zone 22 may also include other components of the vehicle 10. The first thermal bus 20 services the components in the first thermal zone 22 by heating or cooling them. For instance, the first thermal bus 20 may circulate thermal medium for cooling the first front seat 24. The first thermal bus 20 may further circulate thermal medium for cooling other components within the first thermal zone 22. In some embodiments, the first thermal bus 20 may circulate thermal medium for heating in addition to or instead of cooling. Therefore, as used herein, "thermally servicing" and similar phrases include providing thermal medium for cooling and/or heating.

The system 1 includes a first control module 6. As shown, the first control module 6 may be located on or near the first front seat 24. However, the first control module 6 may be in any number of locations, such as another location of the seat 24, on a dashboard, center console, steering wheel or other locations in the vehicle 10. The first control module 6 may be used to control the thermal conditioning of components within the first thermal zone 22. For example, the servicing of the seat 24 by the first thermal bus 20 may be adjusted using the first control module 6. If the seat 24 is too cold, it may be made warmer using the first control module 6. If the seat 24 is too hot, it may be made cooler by using the first control module 6. Other components may likewise be serviced in this manner. Further, the first control module 6 may be used to adjust the thermal conditioning of components within other thermal zones of the vehicle 10. There may also be multiple control modules 6.

The first control module 6 may include a user interface that may be accessed by a user of the system 1 to adjust the thermal output to various components. The interface may be any number of suitable user interfaces, such as a digital interface with touchscreen input and/or a number of other components including a knob that rotates, a switch that is flipped, a button or buttons that are depressed, etc. The first control module 6 may further have or be coupled with a display showing the current setting for thermal conditioning. For instance, a digital display may show the temperature that the seat 24 is set to along with the current temperature of the seat 24, and other suitable information. The display may also be in a different location from the first control module 6, such as the dashboard or integrated with the vehicle's various instrument panels.

The first control module 6 may include various electronic and/or computing components. Those of skill in the art will appreciate that the term "control module" as used herein can refer to, be a part of, or comprise a processor that executes code, an Application Specific Integrated Circuit (ASIC), an electronic circuit, a combinational logic circuit, a field programmable gate array (FPGA), a hard-wired feedback control circuit, other suitable components that provide the described functionality, or a combination of some or all of the foregoing. The control unit can further comprise memory (shared, dedicated, or group) that stores code executed by the control unit. Thus, in some embodiments, the first control module 6 may include a microprocessor, memory storage and programs to execute control logic. The first control module 6 may receive input from a number of sensors and may adjust various operating parameters of the system 1 based on such input. Any suitable control algorithms may be implemented. The first control module 6 may be coupled with various sensors and/or devices of the first thermal zone 22, such as with thermal sensors or a miniature compressor, heat transfer device, etc. to adjust the thermal output to certain components. In some embodiments, the first control module 6 may be near or part of an electronic control unit or module of the vehicle 10 for controlling various operations of the vehicle 10 over, for example, a controller area network (CAN) bus of the vehicle 10. Further details of the various sensors and devices that may be coupled with the control module 6 are discussed herein, for example with respect to FIG. 8.

As shown, the system 1 includes a second thermal zone 42. In some embodiments, the system 1 may include only one thermal zone or more than two thermal zones. As shown, the second thermal zone 42 includes a first rear seat 44 and is at least part of a rear passenger compartment of the vehicle 10. The rear passenger compartment may be a second or thud row sealing area behind a from row sealing area where one or more passengers sit in the rear of the vehicle 10. As shown in FIG. 1A, the system 1 also includes a second thermal bus 40 located within the second thermal zone 42 and separate from the first thermal bus 20. The second thermal bus 40 thermally services various components of the vehicle 10 within the second thermal zone 42. The second thermal bus 40 and the second thermal zone 42 are similar to the first thermal bus 20 and the first thermal zone 22, except the second system 40 and zone 42 service different components of the vehicle 10. As shown, the second thermal bus 40 thermally services the first rear seat 44. The second thermal bus 40 may also service other components of the vehicle 10 within the second thermal zone 42.

The system 1 includes a second control module 8. The second control module 8 may be similar to the first control module 6. In some embodiments, the second control module 8 is used to control the thermal settings of components within the second thermal zone 42. For example, the servicing of the first rear seat 44 by the second thermal bus 40 may be adjusted using the second control module 8. The second control module 8 may, instead or in addition to components within the second thermal zone 42, be used to control thermal servicing of components outside the second thermal zone 42. As shown, the second control module 8 may be located on or near the first rear seat 44. However, the second control module 8 may be in any number of locations. The second control module 8 may further have any or all of the features and functionalities as the first control module 6, including but not limited to electronic control components and/or configurations discussed in further detail herein, for example with respect to FIG. 8.

The thermal buses 20, 40 of the system 1 may be thermally coupled indirectly or directly with a condenser or radiator 2 located outside the passenger compartment in, for example, an engine compartment at the front of the vehicle. The condenser 2 may be part of a thermal energy source 604, as discussed in further detail herein, for example with respect to FIG. 6. In some embodiments, the radiator 2 may be the condenser 720 of the miniature vapor compression system 700 as discussed in further detail herein, for example with respect to FIG. 7. The condenser or radiator 2 can be located in front of or otherwise near an engine radiator. The radiator 2 can be a heat transfer device, such as for example, a low temperature core. Accordingly, ambient air can be passed over the condenser or radiator 2 to remove thermal energy with the condenser or radiator 2 providing a heat sink to ambient. The condenser or radiator 2 may emit or radiate heat absorbed by (e.g., thermal energy transferred to) the thermal buses 20, 40 from the devices and components therein. As shown, the system 1 may be thermally coupled with a battery 4. The battery 4 may be a thermal battery as discussed in further detail herein, for example with respect to FIG. 6. The battery 4 may be thermally coupled with the thermal buses 20, 40 such that main lines within each bus 20, 40 circulate thermal medium through the battery for thermal energy storage.

FIG. 1B is a top view of the system 1. As shown, the system 1 includes multiple components of the vehicle 10 being serviced by a single thermal bus within a single thermal zone. The first thermal bus 20 services various (one or more) components within the first thermal zone 22. These components include the first front seat 24 as well as a second front seat 25 and a first center console 26. The first front seat 24 may be a driver side seat in the front row seating area of the vehicle 10. The second front seat 25 may be a passenger side seat in the front row seating area of the vehicle 10. The center console 26 is located between the two front seats 24, 25 and includes a first bin 28. The first bin 28 includes a compartment for cooling and/or heating articles that is thermally serviced by the first thermal bus 20. The first thermal bus 20 provides thermal medium for cooling or heating the compartment or compartments within the first bin 28. The first center console 26 also includes first cup holders 30 for cooling and/or heating beverages. The first cup holders 30 are serviced by the first thermal bus 20. For instance, the first thermal bus 20 may provide thermal medium for cooling or heating the first cup holders 30.

The system 1 also includes a first thermal energy source 32. As shown, the first thermal energy source 32 may be located in, on or otherwise with the first center console 26. The first thermal energy source 32 provides thermal energy to the thermal medium of the first thermal bus 20. Therefore, in some embodiments, the first thermal energy source 32 is located within the first center console 26 and is in thermal communication with the first thermal bus 20. In some embodiments, the first thermal energy source 32 may be located within the first thermal zone 42. The first thermal bus 20 uses the first thermal energy source 32 to thermally service the first front seat 24, the second front seat 25, the first bin 28 and the first cup holders 30. Therefore, the first thermal bus 20 can service multiple components of the vehicle 10 within the first thermal zone 22. In some embodiments, the first thermal energy source 32 can service components of the vehicle 10 outside the first thermal zone 22, for example by serving as a backup thermal energy source for components in the second thermal zone 42. In some embodiments, the first thermal energy source 32 can directly service (e.g., act as the primary thermal energy source for) the components of the vehicle in the second thermal zone 42.

Similarly, the second thermal bus 40 may service one or more components of the vehicle 10, which components may be within the second thermal zone 42. As shown, the second thermal bus 40 services the first rear seat 44, the second rear seat 45, and the second center console 46. Further, the second center console 46 includes a second bin 48 and second cup holders 50. The second thermal bus 40 may be thermally coupled with a second thermal energy source 52, which may be located within the second center console 46. The second thermal bus 40 can be in thermal communication with the second thermal energy source 52 and use energy from the energy source 52 to service the various components of the second thermal zone 42. As shown, the second thermal bus 40 may use thermal energy from the second thermal energy source 52 to thermally service the first rear seat 44, the second rear seat 45, the second bin 48 and the second cup holders 50. The first rear seat 44 may be a driver side rear seat in the vehicle 10. The second rear seat 45 may be a passenger side rear seat in the vehicle 10. In some embodiments, the second thermal bus 40 may use thermal energy from the first thermal energy source 32 solely or in combination with other thermal energy sources, such as the second thermal energy source 52.

In some embodiments, there may be fewer or more than two thermal zones 22, 42 and/or two thermal buses 20, 40. For example, there may be a third thermal zone and/or a third thermal bus. A third thermal zone and bus may thermally service other areas of the vehicle, such as a third row seating area, the trunk, components in the doors, etc.

Figure 2:
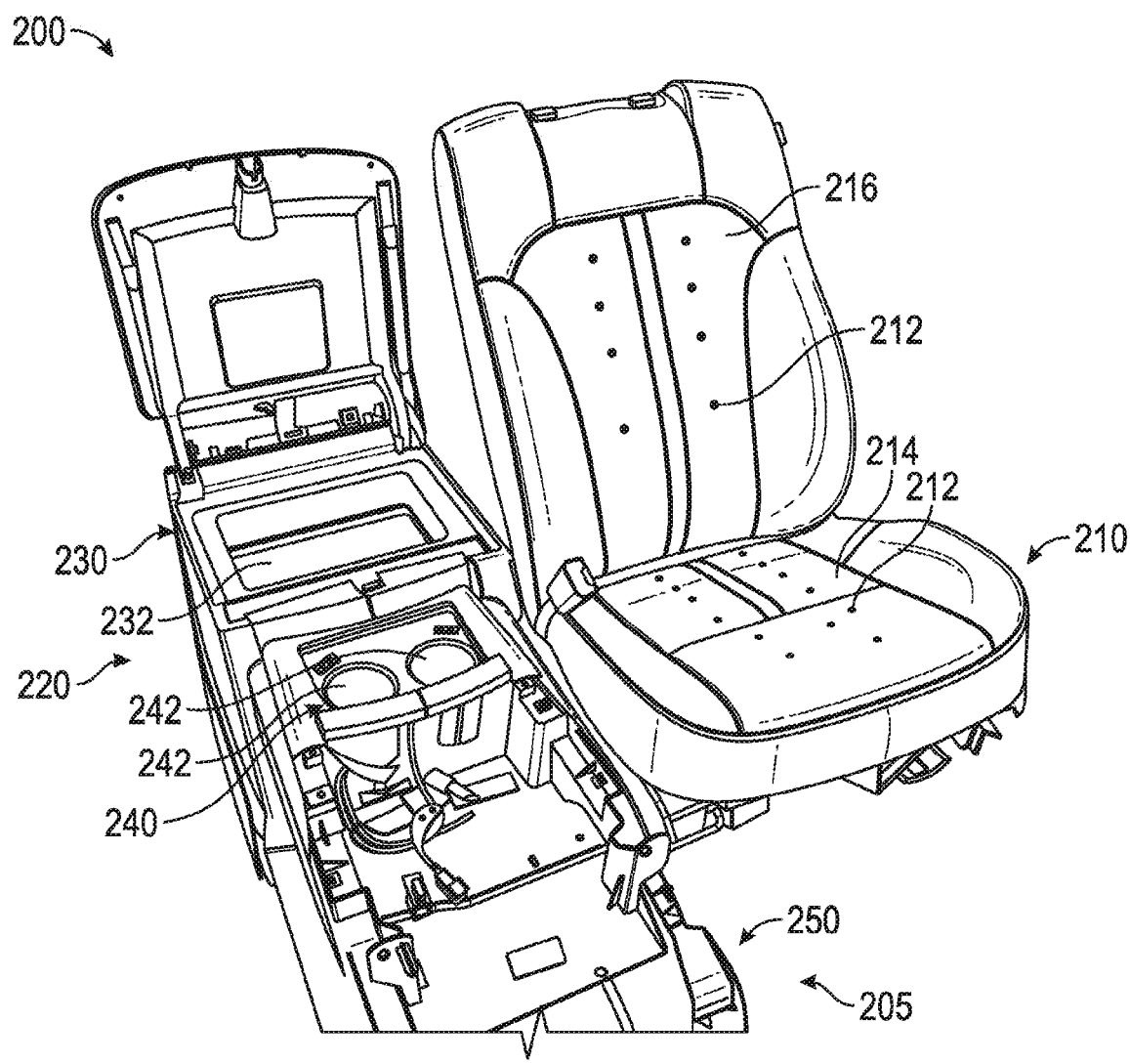
FIG. 2 is a perspective view of an embodiment of various vehicular components serviced by a thermal bus that may be used in the system of FIG. 1A.

FIG. 2 is a perspective view of an embodiment of a thermal zone 200 that includes various components serviced by a thermal bus 205 that may be used in the vehicle 10 of the system 1 shown in FIGS. 1A-1B. As shown in FIG. 2, the thermal zone 200 includes a thermal bus 205. The components serviced by the thermal bus 205 include a seat 210, and a center console 220 that includes a bin 230 and two cup holders 240.

The components shown in the thermal zone 200 may be located within an interior compartment of a vehicle. For example, the seat 210 and the center console 220 may be within the vehicle 10 of FIG. 1A. As shown in FIG. 2, the seat 210 is located adjacent to the center console 220. The center console 220 includes the bin 230 located near the rear of the center console 220. The cup holders 240 are located in front of the bin 230 in the center console 220.

As shown, a thermal energy source 250 is located in front of the cup holders 240. In some embodiments, the thermal energy source 250 can be positioned in other locations of a vehicle while remaining sufficiently proximate to thermally conditioned components to achieve thermal conditioning as discussed herein. The thermal energy source 250 is in thermal communication with thermal medium of the thermal bus 205. The thermal energy source 250 thus absorbs or provides thermal energy to the thermal medium of the thermal bus 205. The thermal energy source 250 absorbs heat from the thermal bus 205 to provide cooling and provides heat to the thermal bus 205 to provide heating. In this way, the thermal energy source 250 provides thermal energy for the thermal bus 205 to service the seat 210 and the components of the center console 220. The thermal bus 205 can service these components via, for example, a single fluid line or circuit that extends to the thermal energy source 250, as discussed in further detail herein, for example with respect to FIG. 6. The single fluid line or circuit can be a loop system that recirculates a cooling medium or fluid, such as for example, a coolant. Further details of thermal systems and thermal energy sources that may be used in the thermal zone 200 are provided herein, for example, with respect to FIGS. 6 and 7. The zone 200 shown in FIG. 2 is merely one example of a possible arrangement of the components and thermal bus 205 within the thermal zone 200. Other suitable configurations may be implemented.

The seat 210 can include occupant support surfaces having multiple thermal conditioning areas 212. The areas 212 are portions of the seat 210 that are thermally conditioned, for example by conduction, convection, or a combination of both. By "thermally conditioned" it is meant that the areas 212 are thermally cooled or heated. Further, the areas 212 are the primary locations that are thermally conditioned, but other parts of the seat may receive such thermal conditioning. As shown, the seat 210 has perforations or other openings in the thermal conditioning areas 212 on a seat bottom portion 214 and on a seat back portion 210 through which conditioned air passes. The perforations in the areas 212 are arranged in a generally linear configuration along the lengths of the portions 214, 216. This arrangement is merely one example, and the perforations within the thermal conditioning areas 212 may be arranged in a number of different configurations within or on the seat 210. Further, the conditioning areas 212 may be implemented in a number of ways besides using perforations. In some embodiments, the conditioning areas 212 may include other openings such as slots, and/or other components to condition and/or distribute the conditioned air, such as beating mats. Thus, the conditioning areas 212 may include portions of the various thermally conditioned components besides those portions in the immediate vicinity of the conditioning areas 212. Further details of such embodiments, for example those that include heater mats, are discussed herein, for instance with respect to FIG. 6.

The bin 230 is an apparatus within the center console 220 that allows for storage of items to be thermally conditioned. In some embodiments, the bin 230 may be an integrated cooler, such as with thermal insulation, in a vehicle within which items may be placed to be kept cool or warm. The bin 230 may also be an enclosure. In some embodiments, the bin 230 is an enclosure that may be opened and closed to access the interior of the enclosure. The bin 230 includes a thermal conditioning area 232. The area 232 is thermally conditioned by the thermal bus 205. Therefore, the area 232 may be a cooled volume within the bin 230. For example, the area 232 may be a cavity defined by the bin 230 in which drinks and other items may be placed to be kept cool or warm.

The cup holders 240 include thermal conditioning areas 242 within respective beverage receptacles. As shown, there are two cup holders 240 and two areas 242 with each cup holder 240 having an area 242. The areas 242 are thermally conditioned by the thermal bus 205. The thermal bus 205 provides heating and/or cooling to items placed within the thermal conditioning areas 242. For example, cups may be placed within the areas 242 and kept cool or heated by the thermal bus 205.

The thermal energy source 250 provides the thermal energy for the thermal bus 205 to thermally service these and other components. The energy source 250 may use a liquid thermal medium within a single line to service the seal 210, the bin 230 and the cup holders 240. Further details of the thermal bus 205 and the thermal energy source 250 that may be implemented within the thermal zone 200 are discussed herein, for example, with respect to FIGS. 6 and 7.

Figure 3A:
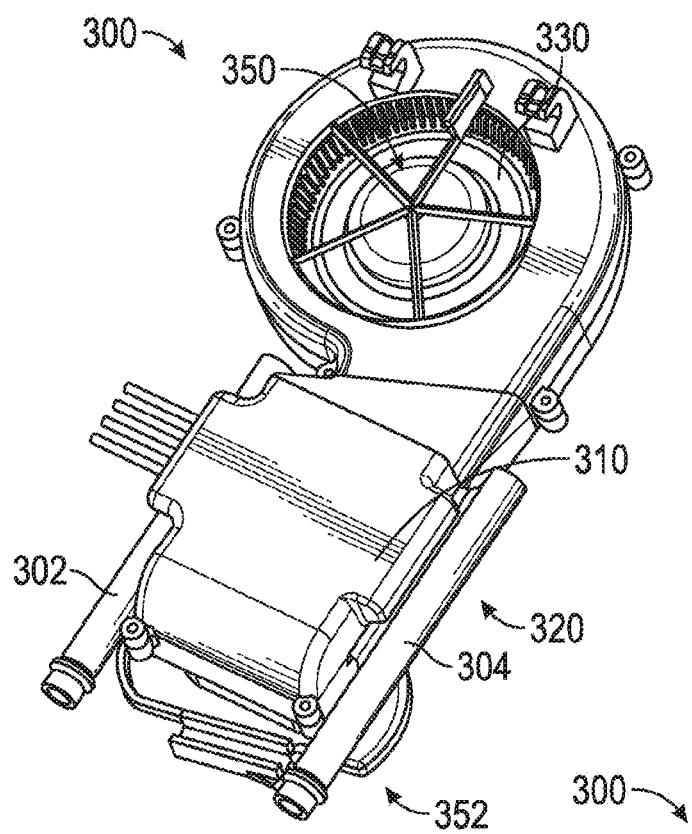
FIGS. 3A-3B are perspective views of an embodiment of a thermal conditioning device of a thermal bus that may be used in the system of FIG. 1A.
Figure 3B:
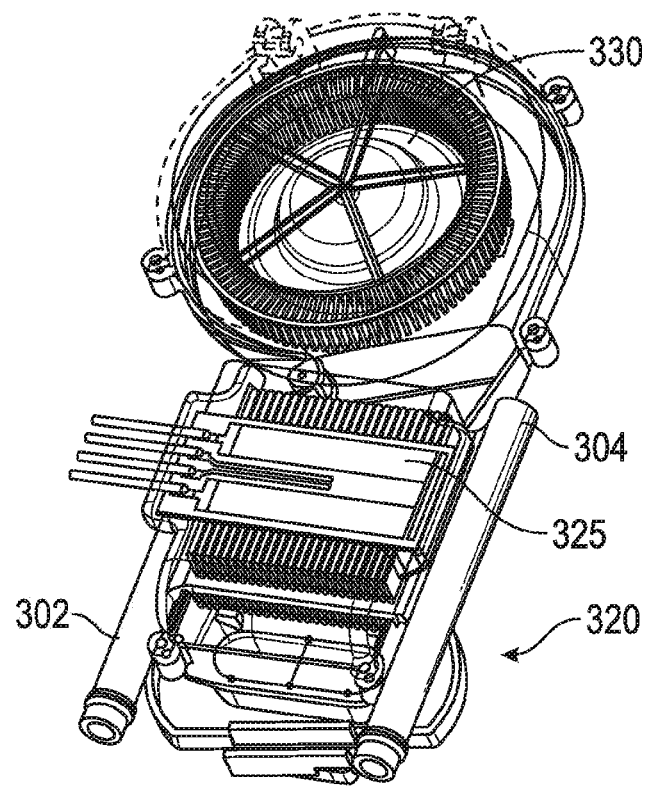

FIGS. 3A-3B are perspective views of an embodiment of a thermal conditioning device 300 which can be coupled to a thermal bus according to the present disclosure and may be used in the system 1 of FIGS. 1A-1B. The thermal conditioning device 300 can service a vehicle seat back or bottom by providing conditioned air to thermal conditioning areas of the seat. For instance, the thermal conditioning device 300 may be part of the first front seat 24, or any other seats. As another example, the thermal conditioning device 300 may also be part of the seat back portion 216 to provide thermally conditioned air to the conditioning areas 212 as shown in FIG. 2.

As shown in FIG. 3A, the thermal conditioning device 300 includes a cover 310. The cover 310 encloses the internal components of the thermal conditioning device 300. The depicted cover 310 encloses a heat transfer device 320, which may be a heat exchanger, and a fan 330. In FIG. 3B, the cover 310 has been removed from the thermal conditioning device 300. As shown, the heat transfer device 320 includes a convective heater substrate 325. Other heat transfer dev ice components may be implemented. The fan 330 draws in air through an inlet 350 and forces the air over the heat transfer device 320, where the air is conditioned, and out through an outlet 352. In some embodiments, the device 320 may also incorporate a thermal electric device ("TED").

The thermal conditioning device 300 may also include lines to receive and/or circulate thermal medium therein. As shown, the thermal conditioning device 300 may include a first line 302 and a second line 304. Thermal medium may be in thermal communication with and be thermally conditioned by a thermal energy source, such as the thermal energy source 250 of FIG. 2, and circulated into the thermal conditioning device 300 through the first line 302 and may exit through the second line 304. The lines 302, 304 may be coupled with corresponding inlet and outlet lines of the thermal energy source, for example with the incoming line 580 and the outgoing line 582 of the thermal energy source 570 described with respect to FIG. 5F. The thermal medium may be used by the heat transfer device 320 to exchange heat. The lines 302, 304 may therefore extend along, near, on, or otherwise in proximity to the heat transfer device 320 such that the lines 302, 304 or extensions thereof are in thermal communication with the heat transfer device 320. In some embodiments, the first line 302 and the second line 304 may be two ends of the same, single line that extends through the thermal conditioning device 300. The configuration shown is merely one example, and other suitable arrangements may be implemented, such as more than the two lines 302, 304 and/or located in other locations of the thermal conditioning device 300.

Figure 4A:
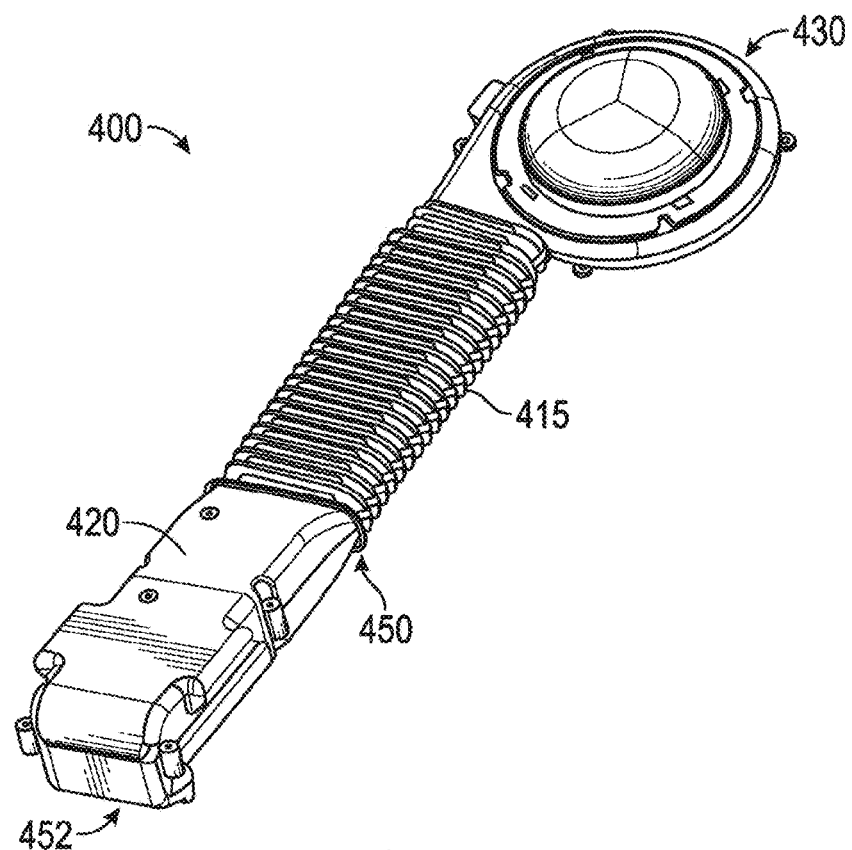
FIGS. 4A-4B are perspective views of another embodiment of a thermal conditioning device of a thermal bus that may be used in the system of FIG. 1A.
Figure 4B:
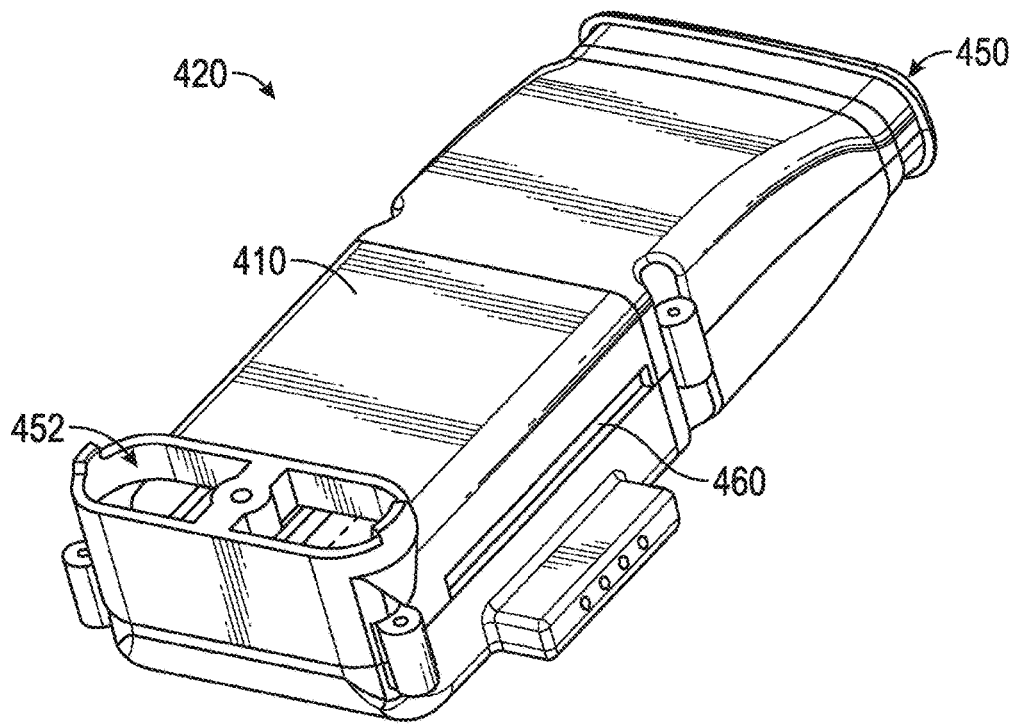

FIGS. 4A-4B are perspective views of an embodiment of a thermal conditioning device 400 that may be used in the system 1 of FIGS. 1A-1B. For instance, the thermal conditioning device 400 may be part of the first front seat 24, or any of the other seats 25, 44, 45. As another example, the thermal conditioning device 400 may also be part of the seat bottom portion 214 shown in FIG. 2.

As shown in FIGS. 4A-4B, the thermal conditioning device 400 includes an adjustable channel 415 connecting a duct 420 to a fan 430. The fan 430 moves air through the adjustable channel 415 and into an inlet 450 of the duct 420. The adjustable channel 415 may be flexible such it can be contorted, directed, moved, or positioned into different configurations. As shown, the channel 415 is generally straight, but it may be bent or combinations of straight, bent, curved, etc. After flowing through the adjustable channel 415, the air flows through the duct 420 and over a heat transfer device 460 (see FIG. 4B), which may be a conductive plate such as a cold plate. The air is conditioned as it moves over the heat transfer device 460, for example the air may be cooled by a cold plate. The air then moves through the duct 420 and exits through the outlet 452. The duct 420, the heat transfer device 460, and/or other components may be covered by a housing 410, as shown in FIG. 4B. In some embodiments, the thermal conditioning device 400 may also incorporate a thermal electric device ("TED"). The TED may also be covered by the housing 410.

The thermal conditioning device 400 may also include one or more lines to receive and/or circulate thermal medium therein. Thermal medium may be in thermal communication with and be thermally conditioned by a thermal energy source, such as the thermal energy source 250 of FIG. 2, and circulated through the lines into the thermal bus 205. The lines may be coupled with corresponding inlet and outlet lines of the thermal energy source, for example with the incoming line 580 and the outgoing line 582 of the thermal energy source 570 described with respect to FIG. 5F. The thermal medium may be used by the heat transfer device 460 to exchange heat. For instance, the heat transfer device 460 may be cooled by the thermal medium (e.g., thermal energy transferred from the heat transfer device 460 to the thermal medium) such that the air is cooled flowing over the heat transfer device 460. The cooled air may then flow to thermally condition a component.

The thermal conditioning devices 300, 400 may be "open loop air" systems that do not reuse thermally conditioned air. For instance, the thermal conditioning devices 300, 400 may move thermally conditioned air, such as cooled or warmed air, through the regions of a seat and exit the seat, such as through the thermally conditioned areas 212 of the seat 210 shown in FIG. 2. This is in contrast to a "closed loop air" system that reuses the conditioned air, as further described herein, for example, with respect to FIGS. 5B and 5C. However, the "open loop air" system is merely one example of the subsystems 300 and 400 that may be implemented. Other suitable systems, such as the "closed loop air" system, conductive plates, or others described herein, may be implemented for a seat as well.

Figure 5A:
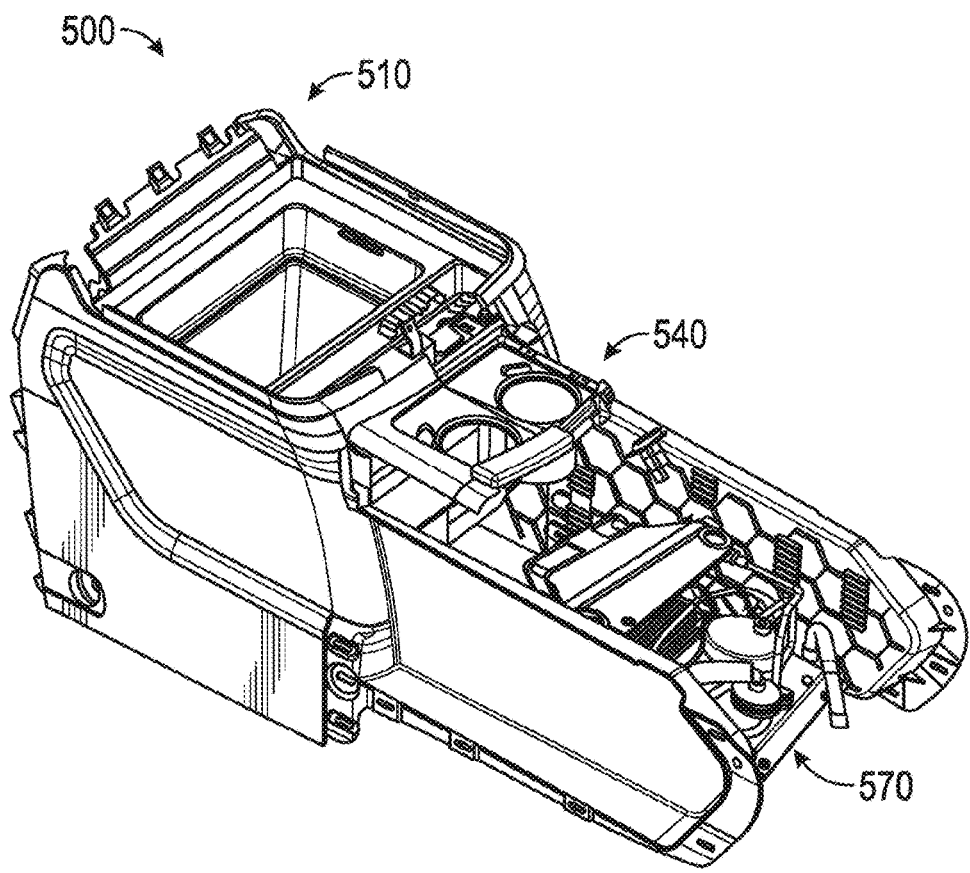
FIG. 5A is a perspective view of an embodiment of a vehicle center console region of a thermal bus having a bin, a cup holder and a thermal energy source, that may be used in the system of FIG. 1A.

FIG. 5A is a perspective view of an embodiment of a vehicle center console thermal subsystem 500 that may be used in the system of FIG. 1A. As shown, the center console thermal subsystem 500 includes a bin 510, two cup holders 540, and a thermal energy source 570. The bin 510, the cup holders 540, and/or the thermal energy source 570 may be used in the center console 220 of FIG. 2 or in the center consoles 26, 46 of FIGS. 1A-1B. Details of the bin 510 are further described with respect to FIGS. 5B and 5C. Further details of the cup holders 540 are discussed with respect to FIGS. 5D and 5E. The thermal energy source 570 is discussed in further detail with respect to FIG. 5F.

Figure 5B:
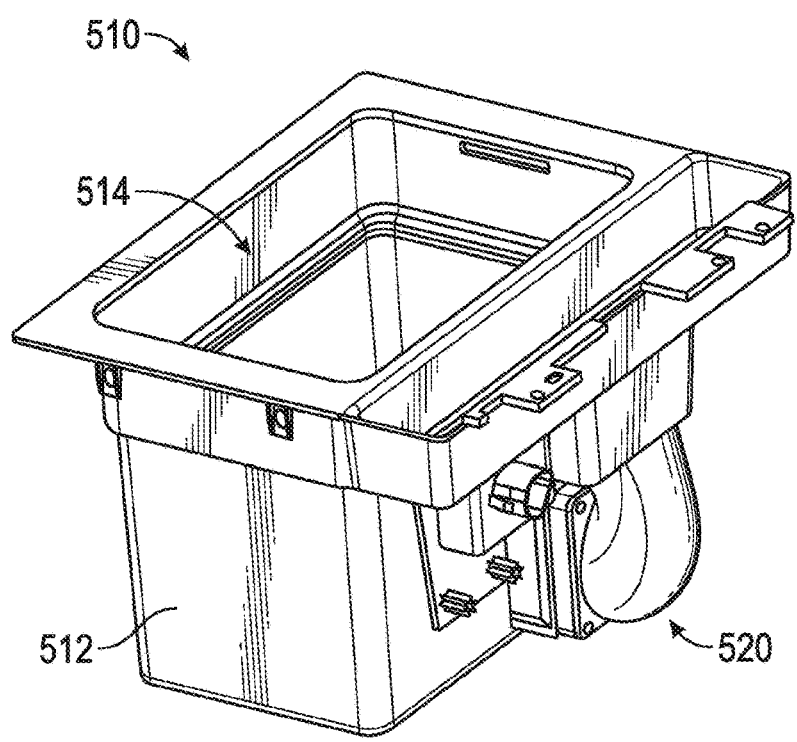
FIGS. 5B and 5C are perspective and exploded views, respectively, of the bin of FIG. 5A.
Figure 5C:
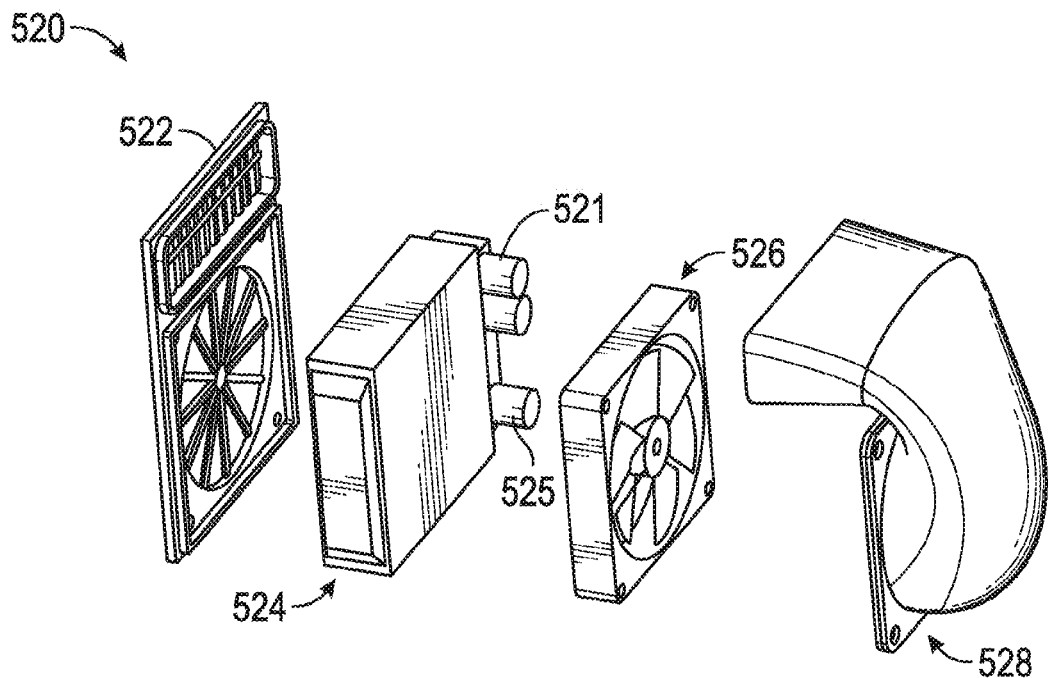

FIGS. 5B and 5C are perspective and exploded views, respectively, of the bin 510 of FIG. 5A. As shown in FIG. 5B, the bin 510 includes a structural body 512. The body 512 defines a cavity 514 on the interior of the bin 510. The cavity 514 is a thermal conditioning area where items placed therein may be thermally conditioned. Therefore, the cavity 514 may be similar to the thermal conditioning area 252 of FIG. 2. As further shown in FIG. 5B, the bin 510 includes a thermal conditioning device 520. The thermal conditioning device 520 forms part of a thermal bus that services the multiple components. For example, the thermal conditioning device 520 may be part of the first thermal bus 20 or second thermal bus 40 of FIGS. 1A-1B. Further, the thermal conditioning devices 300, 400, and 520 may all be part of the same thermal bus, for instance the thermal bus 20 or 40.

Referring now to FIG. 5C, the thermal conditioning device 520 is shown in an exploded view. The thermal conditioning device 520 includes a grill 522. The grill 522 is installed in or on the bin 510, such as along an interior wall of the structural body 512. The grill 522 provides a series of openings for air to enter and/or exit the cavity 514 of the bin 510.

As shown, the thermal conditioning device 520 also includes a heat transfer device 524, such as a heat exchanger. The heat transfer device 524 is located adjacent to the grill 522. The heat transfer device 524 thermally conditions the air that is blown into the bin 510. The thermally conditioned air is blown into the bin 510 by a fan 526 adjacent to the heat transfer device 524. For example, the air may be drawn from the bin 510 across the heat transfer device 524 to be heated or cooled by the heat transfer device 524 and then blown by the fan 526 back into the bin 510.

The fan 526 blows the thermally conditioned air into a duct 528. The duct 528 defines a channel for air to flow through. The duct 528 recirculates air from inside the cavity 514 of the bin 510. For example, air from inside the cavity 514 may flow through an inlet defined by an upper section of the grill 522 and into the duct 528. The air may then be blown by the fan 526 over the heat transfer device 524 and into an outlet defined by a lower section of the grill 522, such that thermally conditioned air is provided back to the cavity 514 of the bin 510. Therefore, the thermal conditioning device 520 is a "closed loop air" system. This is merely one example of how the bin thermal conditioning device 520 may be implemented with the bin 510. Other types of thermal systems, such as the "open loop air" subsystems 300, 400 described with respect to FIGS. 3A-4B, conductive plates, or others described herein, may also be implemented.

The thermal conditioning device 520 may also include one or more lines to receive and/or circulate thermal medium therein. As shown in FIG. 5C, the subsystem 520 may include a first line 521 and a second line 525. Thermal medium may be received from a thermal energy source, such as the thermal energy source 250 of FIG. 2, and circulated into the subsystem 520 through the first line 521 and may exit through the second line 525. The lines 521, 525 may be coupled with corresponding inlet and outlet lines of the thermal energy source, for example with the incoming line 580 and the outgoing line 582 of the thermal energy source 570 described with respect to FIG. 5F. The thermal medium may be used by the heat transfer device 524 to exchange heat. The lines 521, 525 may therefore extend along, near, on, or otherwise in proximity to the heat transfer device 524 such that the lines 521, 525 or extensions thereof are in thermal communication with the heat transfer device 524. In some embodiments, the first line 521 and the second line 525 may be two ends of the same, single line that extends through the subsystem 520. The configuration shown is merely one example, and other suitable arrangements may be implemented, such as more than the two lines 521, 525 and/or located in other locations of the subsystem 520.

Figure 5D:
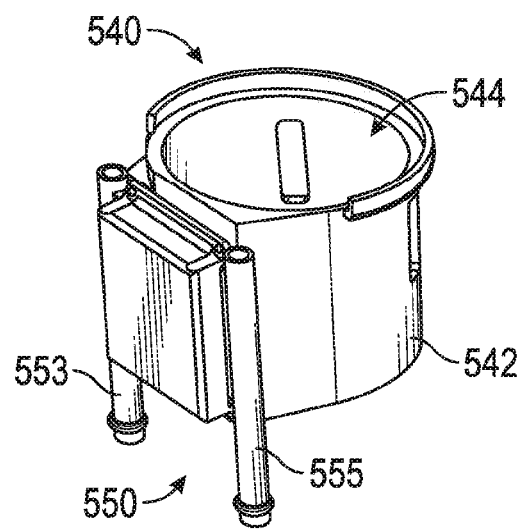
FIGS. 5D and 5E are perspective and exploded views, respectively, of the cup holder of FIG. 5A.
Figure 5E:
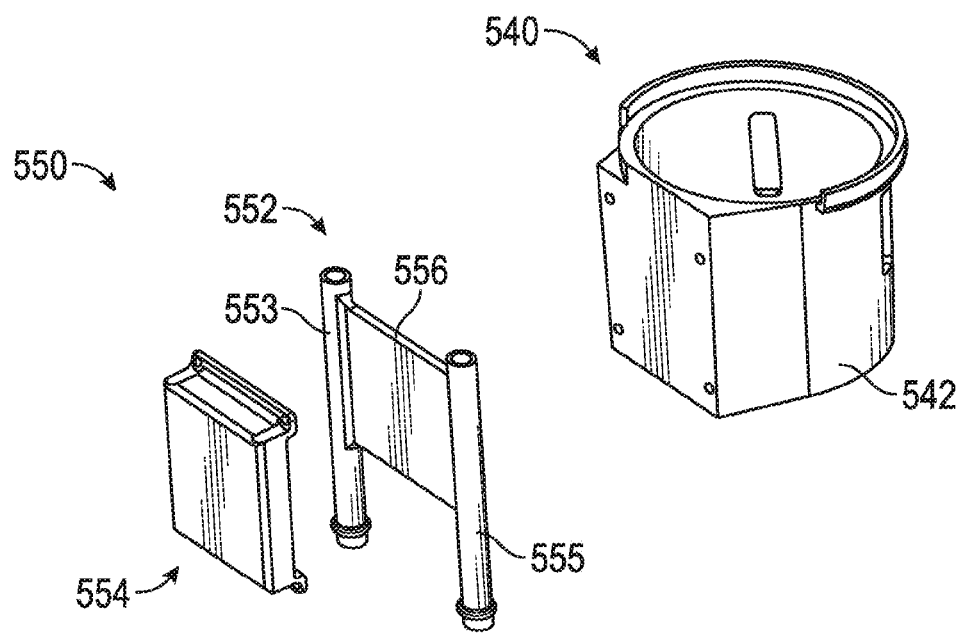

FIGS. 5D and 5E are perspective and exploded views, respectively, of one of the cup holders 540 of FIG. 5A. The cup holder 540 includes a cup receptacle or insert 542. The cup insert 542 defines a cavity 544 on the interior of the cup holder 540. The cavity 544 is the location where items such as a cup may be placed to be thermally conditioned. For example, a cup may be placed within the cavity 544 to be kept cool or warm. Further, the cavity 544 may be the thermally conditioned area 242 of FIG. 2.

As shown in FIG. 5D, the cup holder 540 includes a thermal conditioning device 550, which may be mounted on part of the cup insert 542. The cavity 544 is thermally conditioned by the subsystem 550 via conduction between the cup insert 542 and the thermal conditioning device 550. By thermally conditioning the insert 542, the cavity 544 and any items therein will also be thermally conditioned.

FIG. 5E is an exploded view of the cup holder 540 and the thermal conditioning device 550. The thermal conditioning device 550 includes a heat transfer device 552, such as a conductive plate, and a mounting housing 554 the heat transfer device 552 can directly contact the cup insert 542 to have substantially direct thermal communication with the cup insert 542. Thermal energy such as heat may be removed from or added to the cup insert 542 by conduction through the adjacent, contacting heat transfer device 552, for example, via two facing, contacting surfaces of the cup insert 542 and the heat transfer device 552. The heat transfer device 552 may have the mounting housing 554 mounted thereto. The mounting housing 554 may have insulation preventing heat loss of exchange between the heat transfer device 552 and surroundings other than the cup insert 542.

Figure 5F:
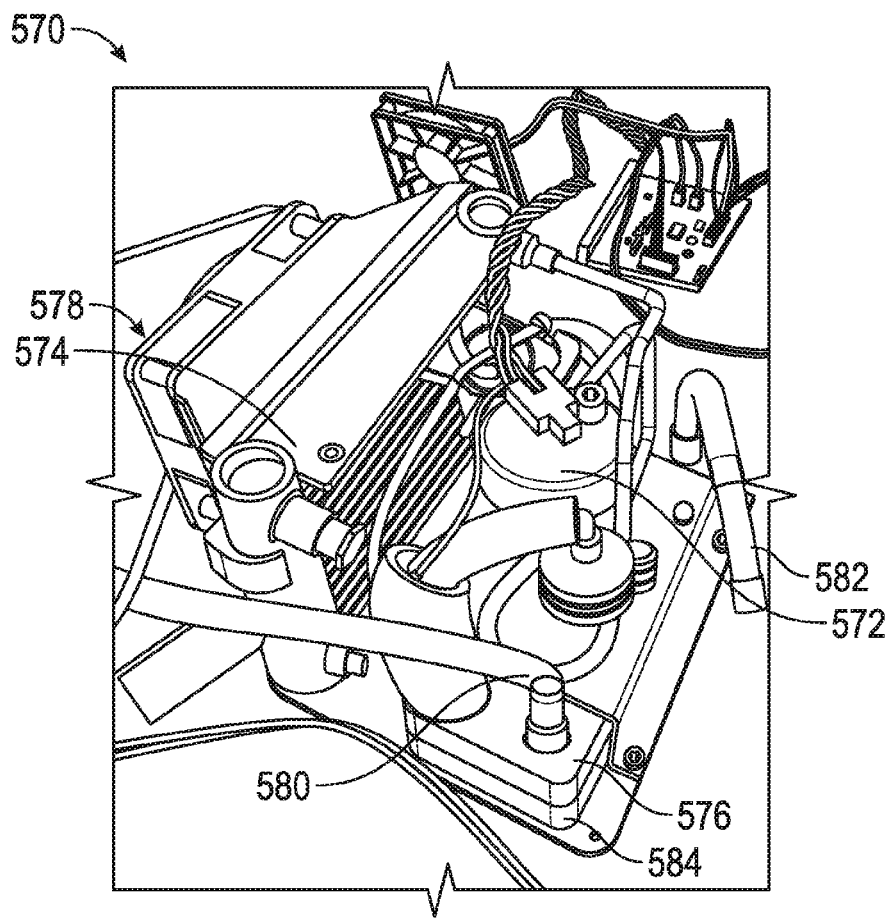
FIG. 5F is a perspective view of an embodiment of a thermal energy source that may be used in the system of FIG. 1A.

The thermal conditioning device 550 may also include one or more lines to circulate thermal medium therein. As shown in FIGS. 5D and 5F, the subsystem 550 may include a first line 553 and a second line 555 fluidly coupled with a conductive plate 556 (see FIG. 5E), which may be a hollow conductive plate Thermal medium may be received from a thermal energy source, such as the thermal energy source 250 of FIG. 2, and circulated into the thermal conditioning device 550 through the first line 553 and the conductive plate 556, and may exit through the second line 555. The lines 553, 555 may be coupled with corresponding inlet and outlet lines of the thermal energy source, for example with the incoming line 580 and the outgoing line 582 of the thermal energy source 570 described with respect to FIG. 5F. The thermal medium may be used by the heat transfer device 552, such as the conductive plate 556, to exchange heat. The lines 553, 555 may therefore extend along, near, on or otherwise in proximity to the heat transfer device 552 such that the lines 521, 525 or extensions thereof are in thermal communication with the heat transfer device 552. In some embodiments, the first line 553 and the second line 555 may be two ends of the same, single line that extends through the thermal conditioning device 550. The configuration shown is merely one example, and other suitable arrangements may be implemented, such as more than the two lines 553, 555 and/or located in other locations of the thermal conditioning device 550. Further, the thermal conditioning device 550 along with the thermal conditioning devices 300, 400, and/or 520 and may all be part of the same thermal bus (e.g. in thermal communication with the same thermal bus), for instance the thermal bus 20 or 40 shown in FIGS. 1A-1B. The thermal conditioning devices 300, 400, 520 and/or 550 may also be thermally coupled (e.g., in thermal communication) with the same thermal energy source, for example a thermal energy source 570 discussed below with respect to FIG. 5F.

FIG. 5F is a perspective view of an embodiment of a thermal energy source 570 that can absorb heat from or provide heat to a thermal bus according to the present disclosure. The thermal energy source 570 may be used in the thermal zone 200 of FIG. 2 or the system 1 of FIGS. 1A-1B. The thermal energy source 570 is configured to be in thermal communication with the thermal bus and, more particularly, the thermal medium used to condition the various thermal regions of a vehicle and various components therein. The thermal energy source 570 provides thermal energy to be used for heating and/or cooling the thermal medium. Further details of the interaction of the thermal energy source 570 with the various thermally conditioned components are provided herein, for example with respect to FIGS. 6 and 7.

As shown, the thermal energy source 570 is coupled with an incoming line 580, an outgoing line 582, and a conductive plate 584, which may be a hollow conductive plate. The thermal medium flows into the conductive plate 584 via the incoming line 580 and out of the conductive plate 584 via the outgoing line 582. The lines 580, 582 may be coupled, directly or indirectly, with corresponding lines on components to be thermally conditioned. For example, the lines 580, 582 may be coupled with the lines 302, 304 of the thermal conditioning device 300 of FIGS. 3A-3B, and/or with the lines of the thermal conditioning dev ice 400 of FIGS. 4A-4B, and/or with the lines 521, 525 of the thermal conditioning device 520 of FIGS. 5B-5C, and/or with the lines 553, 555 of the thermal conditioning device 550 of FIGS. 5D-5E. The thermal energy source 570 further includes a miniature compressor 572. The energy source 570 may have a total volume of about 512 cubic inches. For example, the energy source 570 may generally occupy an area or volume of about 8 by 8 by 8 inches. Other sizes can be accommodated, such as for example, areas or volumes having dimensions (e.g., sides) ranging from about 4 to 12 inches. The miniature compressor 572 may be any of a number of commercially available miniature, small or micro compressors. In some embodiments, the miniature compressor 572 is about the size of a typical twelve ounce soda can.

The thermal energy source 570 also includes a condenser 574 and an evaporator 576. The condenser 574 and the evaporator 576 are coupled with the miniature compressor 572. The condenser 574 or the evaporator 576 provides the thermal energy to the medium circulating through the lines 580, 582. As shown, the evaporator 576 is used as the thermal energy source to provide cooling. In some embodiments, the condenser 574 is used as the thermal energy source to provide heating. As shown, the evaporator 576 may be in direct contact with the conductive plate 584, such that heat is conductively absorbed from the conductive plate 584 by the evaporator 576, thereby removing heat from, i.e. cooling, the conductive plate 584. The thermal energy source 570 may also include a fan 578. The fan 578 may move air over the condenser 574 to remove heat being emitted by the condenser 574. Other approaches to removing the heat emitted by the condenser 574 may be implemented and are discussed in further detail herein, for example, with respect to FIGS. 1A and 7.

The conductive plate 584 therefore thermally communicates with the evaporator 576. Heat may be removed from the conductive plate 584 by the evaporator 576, as mentioned. In this manner, the conductive plate 584 may be used for providing heating or cooling to the thermal medium circulating in the lines 580, 582. The components of the thermal energy source 570 used to provide cooling or heating to the conductive plate 584 may be components of what may be referred to as a "miniature vapor compression system." Further details of the miniature vapor compression system and its interaction with a thermal bus for thermally conditioning various vehicle components are discussed herein, for example with respect to FIGS. 6 and 7.

Figure 6:
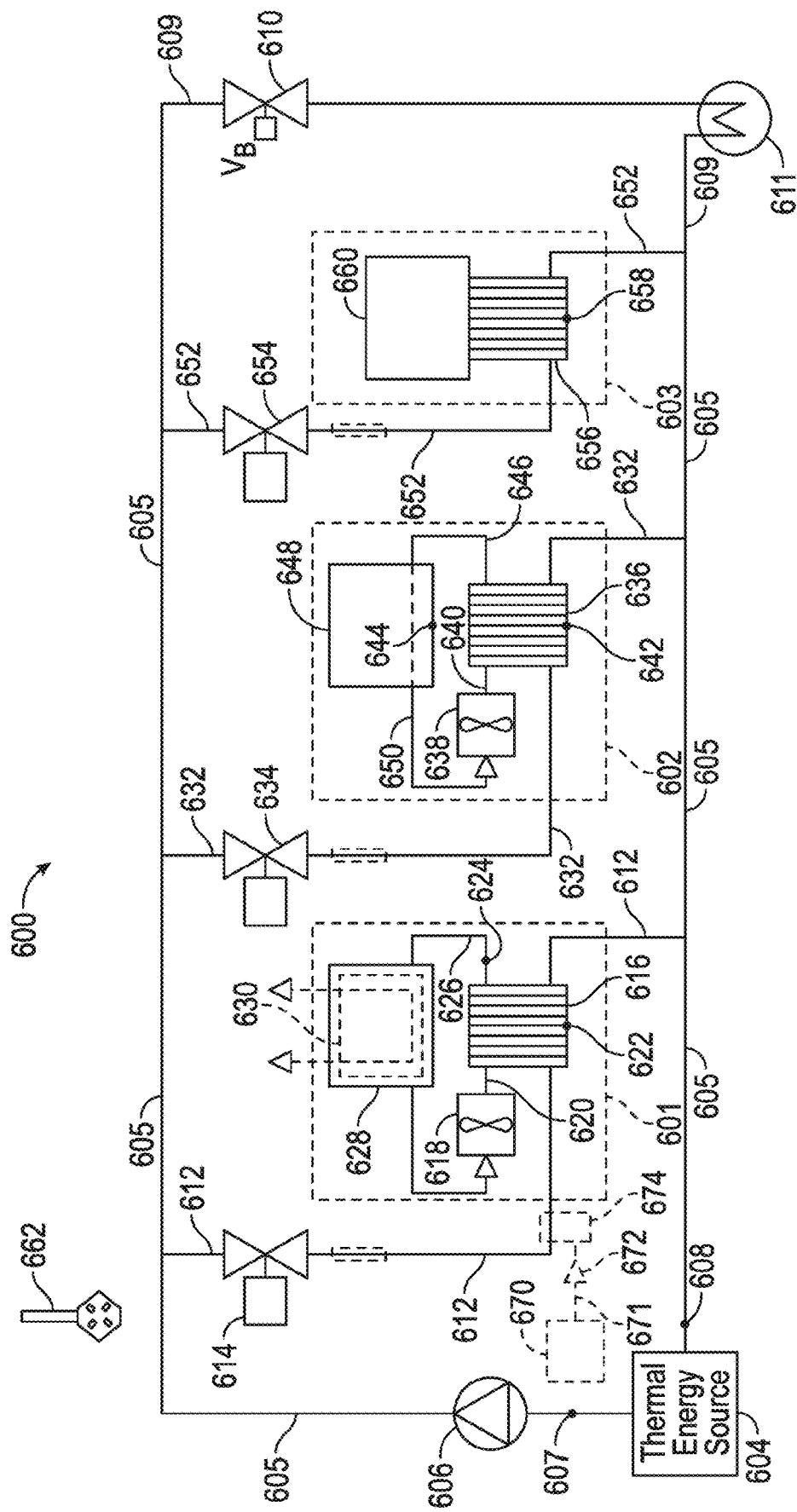
FIG. 6 is a schematic of an embodiment of a thermal bus having a miniature vapor compression system as the thermal energy source and a single thermal medium line that services three different thermal regions that may be used in the system of FIG. 1A.

FIG. 6 is a schematic of an embodiment of a thermal conditioning system for heating or cooling multiple thermal zones or regions of a vehicle. The thermal conditioning system includes a thermal bus 600 with thermal medium that is conditioned by a thermal energy source 604 comprising a miniature vapor compression system. The thermal bus 600 includes a single main line or circuit 605 that services three different regions 601, 602, 603 within the vehicle. The bus 600 and thermal energy source 604 may be used in a variety of embodiments for thermally conditioning one or more components in a vehicle, for example it may be used in the system 1 of FIGS. 1A-1B, in the thermal zone 200 such as for the thermal bus 205 in FIG. 2, or other embodiments described herein.

As shown, the thermal bus 600 includes a first region 601, a second region 602 and a third region 603. The regions 601, 602, 603 include corresponding components of a vehicle that are thermally conditioned, such as a seat, a bin and a cup holder, respectively. For example, the first region 601 may correspond to the first front seat 24 from FIGS. 1A-1B or the seat 210 from FIG. 2. The second region 602 may correspond to the first bin 28 of FIG. 1B or the bin 230 of FIG. 2. The third region 603 may correspond to the first cup holder 30 of FIG. 1B or the cup holders 240 of FIG. 2. As shown in FIG. 6, the regions 601, 602, 603 are indicated by dashed lines that surround various components included with the respective regions. Further detail of the various components within each region 601, 602, 603 are discussed below, however, these are merely examples and the regions 601, 602, 603 may include fewer or more components than are shown and described herein. Further, in some embodiments, there may be more or fewer than three regions. There may be one, two, four or more regions in the thermal bus 600.

As shown, the thermal bus 600 includes thermal medium that is heated and/or cooled by the thermal energy source 604. The thermal energy source 604 may be similar to the thermal energy source 570 described with respect to FIG. 5F. The thermal energy source 604 can provide heating or cooling via an evaporator or a condenser of a vapor compression system. In some embodiments, an evaporator is used in the thermal energy source 604 to provide cooling. In some embodiments, a condenser is used in the thermal energy source 604 to provide heating. Further detail of the thermal energy source 604 is described herein, for example with respect to FIG. 7.

As shown in FIG. 6, the thermal bus 600 has a single main line or circuit 605 that carries a thermal medium which is heated and/or cooled by the thermal energy source 604 and used to condition the various regions 601, 602, 603. The line 605 is, for example, a tube or piping comprising conduits that carries fluid, such as a liquid, gas, vapor or other thermal media, to the various regions. The line 605 extends from the thermal energy source 604 in a loop and returns to the thermal energy source 604. The line 605 may be in thermal communication with the thermal energy source 604 in a variety of locations. In some embodiments, a portion of the line 605 may be in thermal communication with an evaporator of the thermal energy source 604 and another portion of the line 605 may be in thermal communication with a condenser of the thermal energy source 604. A valve may control which portion receives the working fluid in the line 605. In this manner, the thermal energy source may selectively provide heating or cooling. Such a system may be selectively controlled, for example, by the control system 800, as described herein.

The line 605 may include a pump 606 or other fluid moving device designed to circulate the thermal media. The pump 606 causes the thermal medium within the line 605 to circulate through the bus 600. Further, the pump 606 and/or other parts of the bus 600 may include a flow detection sensor or device. Such a sensor may detect if the pump 606, or other components such as the various flow control devices, becomes non-functional and prevents or reduces the flow of fluid through the bus 600. The flow detection sensor may also detect a catastrophic leak in which a tube has become disconnected or burst. In addition, the bus 600 may include a reservoir that contains the working fluid. The reservoir may include a fluid level sensor, for example to detect a lack of fluid in the bus 600 and to protect the pump 606 from damage by running dry. The fluid level sensor may be a float valve sensor, or a more advanced sensor that would monitor actual fluid levels and make a diagnostic decision based on change in fluid levels over time if there is a slow leak.

The thermal bus 600 further includes various temperature sensors. An outgoing temperature sensor 607 can be coupled to the line 605 at a location adjacent the thermal energy source 604 as illustrated, for example downstream in a direction of flow of the thermal medium through the line 605. The outgoing temperature sensor 607 senses the temperature of the thermal medium within the line 605 as the thermal medium leaves thermal communication with the thermal energy source 604. An incoming temperature sensor 608 can be coupled to the line 605 at a location adjacent the thermal energy source 604 as illustrated, for example upstream of the direction of flow. The incoming temperature sensor 608 senses the temperature of the thermal medium in the line 605 as the thermal medium comes into thermal communication with the thermal energy source 604. The sensors 607, 608 may be used to determine if adjustments to the thermal energy source 604 are necessary. For example, if the temperatures sensed by the sensors 607, 608 are too low or too high, operation of the thermal energy source 604 may be adjusted to increase or decrease the amount of heating or cooling provided and thereby adjust the temperature of the thermal medium, respectively.

As shown, the thermal bus 600 can also include a bypass line 609. The bypass line 609 may be a continuation of the line 605 beyond the three regions 601, 602, 603. The bypass line 609 may also be a separate line coupled with the line 605. The bypass line 609 can include a flow control device 610, such as a valve or other device, that regulates the flow of the thermal medium through the bypass line 609. In some embodiments, the flow control device 610 is normally open. The bypass line 605 can be used to help regulate thermal conditioning of the regions 601, 602, 603 as discussed herein.

In some embodiments, flow into the bypass line 609 may be controlled with flow control device(s) in other parts of the bus 600. For example, flow into the bypass line 609 may be controlled with flow control device(s) in the line 605, or in other lines. Flow into and/or through the bypass line 609 may be controlled passively. For example, flow into and/or through the bypass line 609 may be controlled by varying the size of the tubing in the bypass line 609. For example, a smaller diameter section in portion(s) of the bypass line 609 may provide flow restriction to the bypass line 609. Such restriction could be approximately the same as the other lines.

As shown, the bypass line 609 can connect to a thermal battery 611. The thermal battery 611 is heated or cooled, i.e. thermally charged, by the thermal energy source 604. The thermal battery 611 can condition one or more of the interior components during periods when the thermal energy source 604 is not operating. The thermal battery 611 can be charged via one or mote of a refrigerant circuit, a liquid circuit, and an air circuit, such as the main line 605 via the bypass line 609. The thermal battery 611 can be a reservoir within the bypass line 609. The thermal battery 611 may be cooled by the thermal medium within the bypass line 609. The thermal battery 611 may be used to provide smaller amounts of cooling to the bus 600. For example, if the car is off, an auxiliary pump may be run to provide some thermal conditioning to various components of the vehicle. As another example, when the bus 600 is providing cooling, a fan may be run for a period of time after the car has been shut off to provide air to the evaporator in the thermal energy source 604 and prevent it from icing. In some embodiments, the thermal battery 611 may be or include a thermal storage device that, for example, contains either or both a high and low temperature phase change material, such as for example, wax (a higher temperature phase change material) and water (a lower temperature phase change material) to store thermal energy for later use.

The bypass line 609 may continue beyond the thermal battery 611 and couple with (e.g., return to) the main line 605. In some embodiments, the bypass line 609 and the main line 605 may be different regions of the same, monolithic line.

The thermal bus 600 thermally services the regions 601, 602, 603. As shown, the main line 605 may service each region via a branch line. A first branch 612 is connected to the line 605 and services the first region 601. A second branch 632 is connected to the line 605 and services the second region 602. A third branch 652 is connected to the line 605 and services the third region 603. In some embodiments, more than one branch line may service a single region, or a single branch line may service more than one region.

The first region 601 receives thermal medium that flows through the first branch 612 from the line 605. The first branch 612 includes a fluid flow control device 614, such as, for example, a valve. The flow control device 614 is configured to control, direct, allow, inhibit, prevent or otherwise regulate a flow of the thermal medium flowing through the first branch 612 to the first region 601. In some embodiments, the flow control device 614 may selectively open and/or close to regulate the flow of the medium through the first branch 612. Further, the flow control device 614 may be configured to be normally closed and then opened as needed. In some embodiments, the flow control device 614 could be replaced or work with an in-line pump for variable control. A commercially available pump may be used, such as, for example, the Micro AC/DC Water Pump manufactured by Alita Industries, Inc., of Arcadia, Calif.

The first region 601 includes a heat transfer device 616, a fan 618 and a first thermal node 628 such as a seat in a vehicle. The thermal medium within the first branch 612 is circulated to the heat transfer device 616. The heat transfer device 616 is a heat exchanger or other similar device configured to exchange heat between the thermal medium within the first branch 612 and air supplied by the fan 618 to the first thermal node 628. For example, the heat transfer device 616 may have multiple fins coupled to the branch 612 through, on, around, or otherwise within proximity of which the air flows. The thermal medium then flows through and exits the heat transfer device 616 in the first branch 612 and reconnects with the main line 605, through which the thermal medium returns to the thermal energy source 604.

The heat transfer device 616 is m thermal communication (e.g., thermally coupled or connected) with the first branch 612 such that the thermal medium flowing through the first branch 612 thermally conditions a fluid, such as air, flowing through an adjacent or conditioning line 620, such as a duct, that is in thermal communication (e.g., thermally coupled or connected) with the heat transfer device 616. As shown, the line 620 connects the fan 618 to the heat transfer device 616. The fan 618 blows air through the line 620 such that it is thermally conditioned by the heat transfer device 616.

The temperature of the heat transfer device 616 depends on a set, predetermined, or desired temperature point for the first thermal node 628. For instance, the controls 6, 8 of FIG. 1A may be used to set a desired temperature. Based on the set temperature, a particular amount of thermal power, i.e. thermal energy transfer with respect to time, may be applied. For instance, for the first node 628, the temperature of the heat transfer device 616 may be set to be at twenty six degrees Celsius (26° C.) and to deliver sixty watts (60 W) of thermal power to the first node 628. Dedicated control valves, such as the flow control device 614, may be selectively opened and closed to regulate the temperature of the heat transfer device 616. In some embodiments, the temperature of the heat transfer device 616 may be limited to maintain condensation production below a predetermined amount that can be evaporated inside the vehicle interior. The temperature limit may be bused on sensors providing data on ambient air temperature and/or humidity. The desired temperature may affect the working fluid temperature, e g the thermal medium temperature, and the flow rate of the working fluid. For instance, the working fluid temperature and flow rate may depend on peak or total thermal power requirements. The temperature of the conditioned fluid, such as the air blown out from the first node 628 such as a seat, may depend on the desired temperature for the node 628. Further derails of a control system that may be implemented are discussed herein, for example with respect to FIG. 8.

The thermally conditioned air then flows from the heat transfer device 616 and into the line 626 that thermally connects the heat transfer device 616 to the first thermal node 628. The thermally conditioned air then circulates through the first thermal node 628 and exits the first thermal node 628 as shown. In this manner, a person near the first thermal node 628, such as a person sitting on a seat, may receive cool air. For example, the first branch 612 may have cold thermal medium flowing to the heat transfer device 616 such that the air blown by the fan 618 through the heat transfer device 616 via the line 620 is cooled. The cooled air then flows through the line 626 to the first thermal node 628. The first thermal node 628 may include various parts of a single component. For instance, for a vehicle seat, the first thermal node 628 may include the seat bottom portion 214 and/or the seat back portion 216 of FIG. 2. In some embodiments, the first thermal node 628 may include a fan, similar to the fan 618, therein to facilitate movement of the conditioned air through the node 628. Further, the first thermal node 628 may be a vent that is located separate from the occupant and that blows conditioned air towards the occupant. For example, the first thermal node 628 may be a vent that is located separate from the seat.

In some embodiments, the first region 601 also includes a heater mat 630 with the first thermal node 628. The heater mat 630 may be used to provide heat to the first thermal node 628. The mat 630 may heat up conditioned or unconditioned air that is blown over and around the mat 630. The mat 630 may be used to heat air which has been cooled to remove moisture to a desired temperature for conditioning the first thermal node 628.

The first region 601 also includes various temperature sensors. As shown, a first temperature sensor 622 is located at the heat transfer device 616. The temperature sensor 622 senses the temperature of the heat transfer device 616 for diagnostic-operational purposes, for example. If the temperature is too high or too low, adjustments may be made to the bus 600, such as adjustments to the thermal energy source 604 or maintenance or repairs to parts of the bus 600. A second temperature sensor 624 can be connected to the line 626 which extends from the heat transfer device 616 to the first thermal node 628. The second temperature sensor 624 senses the temperature of the fluid, such as air, flowing through the line 626 for similar diagnostic operational purposes. This is merely one example of how various temperature sensors may be arranged for providing temperature feedback and control and other suitable configures configurations may be implemented. Further, there may be one, three or more such sensors located within the first region 601. The temperature sensors 622, 624 may provide feedback to a control system that can adjust the level of thermal conditioning provided, as is discussed in further detail herein, for example with respect to FIG. 8.

The first region 601 is shown as an "open loop air" system. However, other types of systems, such as a "closed loop air" system, or others as discussed herein, may be implemented. The second region 602 is shown as such a "closed loop air" system. That is, the air used in the second region 602 is recirculated and reused within the second region 602 and does not leave the second region 602, as the air does in the "open loop air" first region 601.

The second region 602 is conditioned by the second branch 632 connected to the line 605. The second branch 632 includes a fluid flow control device 634 such as, for example, a valve, which may be similar to the flow control device 614 in the first region 601 or may be a pump or other fluid moving device. The flow control device 634 controls, directs, allows, inhibits, prevents or otherwise regulates a flow of the thermal medium circulating through the second branch 632 and to the second region 602.

The second region 602 includes a heat transfer device 636, a fan 638 and a second node 648 such as, for example, a bin. The bin may be a storage container, cooler, or the like. In some embodiments, the second node 648 is the bin 510.

The heat transfer device 636 is a heat exchanger or similar device configured to transfer heat between the thermal medium within the second branch 632 and air circulated by the fan 638. The heat transfer device 636 may be similar to the heat transfer device 616 in the first region 601. As shown, the second branch 632 extends through and exits the heat transfer device 636 and reconnects with the line 605, which returns the thermal medium to the thermal energy source 604. Thermal medium circulates through the second branch 632 from the line 605 to the heat transfer device 636 and back to the line 605. The heat transfer device 636 uses the thermal medium to thermally condition the second region 602. The temperature of the heat transfer device 636 depends on a set, predetermined, or desired temperature point for the second thermal node 628. For instance, the controls 6, 8 of FIG. 1A may be used to set a desired temperature. Based on the set temperature, a particular amount of thermal power, i.e. thermal energy transfer with aspect to time, may be applied. For instance, the temperature of the heat transfer device 636 for conditioning the second node 648 may be set to four degrees Celsius (4° C.) and to provide forty watts (40 W) of thermal power. Similar controls as described with respect to the first region 601 may be implemented with the second region 602.

As shown, the fan 638 blows air through a line 640 connected to the heat transfer device 636. The air blown through the heat transfer device 636 by the fan 638 via the line 640 is thermally conditioned by the heat transfer device 636 and then exits the heat transfer device 636 via the line 646. The line 646 thermally connects the heat transfer device 636 to the second node 648, such as, for example, a bin. In this manner, thermally conditioned air circulated by the fan 638 reaches the second node 648 through the line 646. The second node 648 is also thermally connected to a line 650. The line 650 connects the second node 648 to the fan 638, thereby completing a closed loop air circuit. In this manner, thermally conditioned fluid such as air within the second node 648 recirculates back through the second region 602 to the fan 638 via the line 650. For example, the bin 510 may have thermally conditioned air therein recirculated hack through the second region 602 as discussed herein. Further, the second node 648 may include a fan, similar to the fan 638, therein to facilitate movement of the conditioned air through the node 648.

The second region 602 can also include various temperature sensors. As shown, the second region 602 includes a first temperature sensor 642 coupled with the heat transfer device 636. The first sensor 642 senses the temperature of the beat transfer device 636 for diagnostic purposes, similar to the temperature sensors 622, 624 described above with respect to the first region 601. The second region 602 can also include a second temperature sensor 644. The second temperature sensor 644 is connected to the second node 648. The temperature sensor 644 senses the temperature of the air inside the second node 648 for similar diagnostic purposes. This is merely one example of how various temperature sensors may be arranged, and other suitable configurations may be implemented. The temperature sensors 642, 644 may provide feedback to a control system that can adjust the level of thermal conditioning provided, as is discussed in further detail herein, for example with respect to FIG. 8. Feedback from the temperature sensors 642, 644 can be used by the control system to determine whether an article has been placed in the second region 602 or, for example, a bin 510. For example, the control system can detect a new article within the second region 602 based on a change or rate of change in the temperature sensed by the temperature sensor 644. Articles at a temperature different than a temperature of the second region 602, for example a temperature of the air inside the second node 648, can cause a change or increase in a rate of change in the temperature of the inside air.

The third region 603 is conditioned by the third branch 652 connected to the line 605. The third branch 652 includes a fluid flow control device 654 such as for example, a valve, which may be similar to the valves 634, 614 or pumps in the other respective regions 602, 601. The fluid flow control device 654 may control, direct, allow, inhibit, prevent or otherwise regulate a flow of the thermal medium flowing through the third branch 652 and to the third region 603.

The third region 603 includes a heat exchanger 656 and a third node 660 such as, for example, one or more cup holders. The heat exchanger 656 is connected to the line 605 via the third branch 652. Thermal medium flows to and exits the heat exchanger 656 through the third branch 652. The third branch 652 reconnects with the line 605 and returns the thermal medium to the thermal energy source 604.

The thermal medium flowing through the heat exchanger 656 is used to thermally condition the third node 660. As shown, the third node 660 contacts the heat exchanger 656. Therefore, the third region 603 can be conditioned by conduction. That is, thermal conditioning is provided via conduction of heat from the third node 660 to the heat exchanger 656. For example, coded thermal medium may flow through the third branch 652 and to the heat exchanger 656. The cooled thermal medium in the heat exchanger 656 removes heat from the third node 660 by conduction, thereby cooling the third node 660. For example, the third node 660 may be the cup holder 540 (see FIGS. 5D-5E) where the cup holder body 542 is conductively cooled to provide cooling within the cup holder cavity 544. Although the third region 603 is shown as a conductive system, it may also be implemented with other types of thermal systems, such as the "open loop air" system used in the first region 601, the "closed loop air" system used in the second region 602, or other systems. In some embodiments, the third node 660 may include a fan, similar to the fans 618 or 638, therein to facilitate recirculation or other movement of air through the node 660.

The temperature of the heat transfer device 656 depends on a set, predetermined, or desired temperature point for the third thermal node 660. For instance, the controls 6, 8 of FIG. 1A may be used to set a desired temperature. Based on the set temperature, a particular amount of thermal power, i.e. thermal energy transfer with respect to time, may be applied. For instance, the temperature of the heat transfer device 656 for conditioning the third node 660, may be set to four degrees Celsius (4° C.) and to provide twenty-five watts (25 W) of thermal power. Similar controls as described with respect to the first and/or second regions 601, 602 may be implemented with the third region 603.

The third region 603 can also include various temperature sensors. As shown, the third region 603 includes a temperature sensor 658 coupled with the heat transfer device 656. The temperature sensor 658 may have similar features and functionality as the temperature sensors 622, 642. The temperature sensor 658 senses the temperature of the heat transfer device 656 for diagnostic/operational purposes. The temperature sensor 658 may provide feedback to a control system that can adjust the level of thermal conditioning provided, as is discussed in further detail herein, for example with respect to FIG. 8.

Generally, the thermal bus 600 has been described with respect to a single thermal energy source 604 for conditioning the various regions 601, 602, 603. In some embodiments, the thermal bus 600 can be coupled with a second heat source 670 and a second thermal bus 671 including branches through which a thermal medium flows. A pump 672 or other fluid moving device can cause, control, pump, move, convey, direct, of otherwise regulate a flow of the thermal medium. A fluid flow control device 674 such as, for example, a two-position control valve, can inhibit flow to one of the thermal buses 600, 671 while allowing flow through the other of the thermal buses 600, 671. In this way, each of the thermal buses can be dedicated to providing heating or cooling, and the fluid flow control device 674 can be used to selectively use the thermal buses 600, 671 for independently servicing the various regions 601, 602, 603 based on desired temperatures within the regions.

Heating may also be provided with a separate heater or heat source in other locations of the bus 600. For instance, a separate heater or heat source may be implemented to be in thermal communication with the lines 620 or 626 to provide heating to the first thermal node 628. In some embodiments, a fan such as the fan 618 or another separate fan, may run to move the heated air in the lines 620 or 626 to the first thermal node 628. Further, the bus 600 may also be operated in conjunction with a separate heat source, such as with the aforementioned separate heater and/or with the heater mat 630. For instance, the thermal bus 600 may be operated to condition or precondition (e.g. dry out the air) which may then be moved to one or more of the separate heat sources to provide heating to the first thermal node 628.

The thermal bus 600 may also include a humidity sensor 662. The humidity sensor 662 senses a humidity of air, such as vehicle interior air, used to condition the various regions 601, 602, 603. The sensor 662 may be used to adjust a temperature of the thermal medium within the main line 605 and/or individual branches 612, 632, 652 of the bus 600 to prevent excessive condensate removal from the conditioning air.

Further, the various lines of the bus 600 may include insulation to prevent excessive condensation from forming on the lines. For instance, the line 605 may include insulation to prevent condensation from forming on the outside of line 605. The other lines in the bus 600 may likewise include insulation. In some embodiments, commercially available insulated lines or bundles may be used, such as, for example, the Parflex Multitube® manufactured by Parker Hannifin Corp. of Stafford, Tex., or the Point of Use tubing manufactured by Saint Clair Systems of Washington, Mich.

In some embodiments, condensation may be removed using drain tubes. The drain tubes may route any condensation through one or more of the vehicle body drain plugs. Vehicles typically include one or more dram plugs to seal drain holes located in the vehicle underbody. The drain holes are used during vehicle manufacture, and they may be used in some embodiments here to route any condensation from the interior to outside the vehicle. In some embodiments, wicking type materials may be employed to remove condensate. In some embodiments, such materials may transport the condensate to a warm section of the vehicle to facilitate evaporation.

Figure 7:
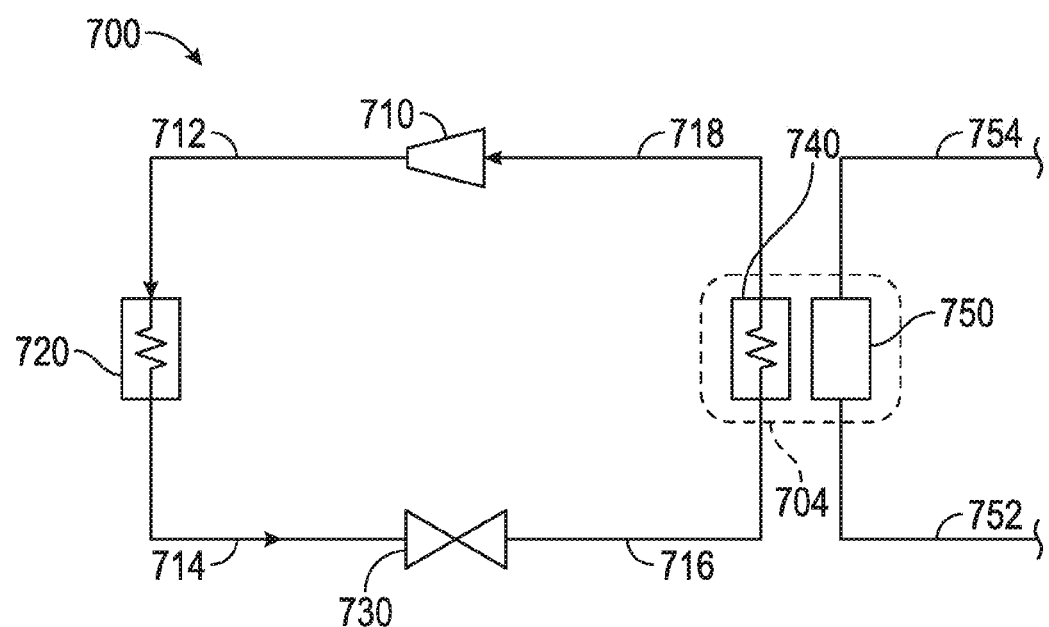
FIG. 7 is a schematic of an embodiment of a miniature vapor compression system that may be used in the system of FIG. 1A.

FIG. 7 is a schematic of an embodiment of a miniature vapor compression system 700 having a miniature vapor compressor 710. The system 700 may be used in the system 1 of FIG. 1A such as to condition thermal medium in the thermal bus 20 or 40, in the thermal bus 205 of FIG. 2 such as with the thermal energy source 250, or in the thermal energy source 570 of FIG. 5F. Circulating thermal media, such as a refrigerant, enters the miniature compressor 710 as a vapor, is compressed to a higher pressure and temperature, and exits the miniature compressor 710 as a superheated vapor at a temperature and pressure at which it can be condensed.

The miniature compressor 710 is connected with a condenser 720 via a line 712. The miniature compressor 710 circulates the superheated vapor to the condenser 720 via the line 712. The compressed air is then cooled and condensed into a liquid by the condenser 720. Heat is thus rejected from the medium in the condenser 720, and the medium becomes a saturated liquid and vapor mixture.

The heat rejected by the condenser 720 may be controlled to reduce or eliminate heating of the vehicle from the rejected heat. In some embodiments, conditioned air from a central air conditioning system may be ducted to the condenser 720 to cool it down. In some embodiments, the heat from the condenser 720 may be routed out of the vehicle. For instance, the condenser 720 may be thermally insulated and coupled with a duct, tubing, or the like, that extends to the exterior of the vehicle, such as to body vents in the trunk or doors of the vehicle. The tubing may also include a one-way valve to allow the heated air to exit the vehicle but present outside air from entering the vehicle through the tubing. The tubing, may also include a fan that can be selectively turned on or off to circulate the air. In some embodiments, the tubing may extend to a radiator or fan at the front of the vehicle in the engine compartment. When the vehicle moves or when the fan is turned on, the air that passes through it may expel the heated air from the tubing.

The condenser 720 is connected to an expansion valve 730 via a line 714. The saturated liquid from the condenser 720 flows through the line 714 to the expansion valve 730. The saturated liquid and vapor mixture undergoes a reduction in pressure in the expansion valve 730 that lowers the temperature of the mixture.

The expansion valve 730 is connected to an evaporator 740 by a line 716, which is connected back with the compressor 710 by a line 718. The liquid and vapor mixture in the evaporator 740 evaporates and thereby draws in heat from the surroundings. A conductive plate 750, such as a cold plate, is coupled to the evaporator 740. The cold plate 750 is cooled due to heat being drawn out of the conductive plate 750 by the evaporator 740.

The evaporator 740 may also be used to form part of a dehumidifier. The dehumidifier may employ the evaporator 740 to cool intake air below its dew point and supply dehumidified air to an air circuit, such as in the "open loop air" or "closed loop air" systems described herein.

In some embodiments, the evaporator 740 may act as a condenser to provide heating when the direction of flow of the thermal medium is reversed. As shown in FIG. 7, the thermal medium flows counterclockwise as illustrated by the arrowheads on lines 712, 714, and 718. However, the thermal medium may flow in the opposite direction, whereby the flow would be in the clockwise direction as illustrated.

A second thermal medium circulates through the conductive plate 750 via a line 752 and exits the conductive plate 750 via a line 754. In this manner, the evaporator 740 and the conductive plate 750 together provide the thermal energy which may be used with another system, such as in the system 600. In some embodiments, the condenser 720 may instead be used to provide heated thermal energy. For instance, the conductive plate 750 or other heat transfer device may be provided with or near the condenser 720.

The system 700 may be controlled by one or more thermal controls to regulate the temperatures of the various components in the vehicle that are thermally conditioned. The controls, such as the controls 6, 8 of FIG. 1A, may regulate the temperatures by controlling operation of the vapor compression system 700 and/or the thermal bus 600. The controls may also regulate heat exchange between the vapor compression system 700, the thermal bus 600, and the various thermally conditioned components. The controls may also adjust various system control parameters, such as compressor speed, condenser and evaporator temperatures, and temperature and flow rate of fluid circulating in the thermal bus 600. The controls regulate the temperatures based on inputs, such as vehicle occupant inputs, and based on feedback from various sensors which measure these and other system parameters. The controls may sense condenser temperature and/or an ambient temperature at vehicle and/or system startup, and regulate operation based on the condenser temperature. For example, the controls may select a heating or cooling mode of operation and/or a heating or cooling profile, and/or regulate a rate of heating or cooling. Further details of a control system that may be implemented are discussed herein, for example with respect to FIG. 8.

The vapor compression system 700 may be used in the various thermal systems described herein. For example, the vapor compression system 700 may provide the thermal energy source 604 of FIG. 6. In some embodiments, the vapor compression system 700 is implemented within the thermal energy source 604. The vapor compression system 700 may be in thermal communication with the main line 605 of the thermal bus 600. For example, the lines 752 and 754 of the vapor compression system 700 may be the line 605 of the thermal bus 600. The vapor compression system 700 may also be used in other embodiments, for example in the first thermal energy source 32 or second thermal energy source 52 of FIGS. 1A and 1B, in the thermal energy source 250 of FIG. 2, in the thermal energy source 570 of FIG. 5A, or others. Accordingly, in some embodiments, the thermal energy source 604 may use the evaporator 740 of the vapor compression system 700, for example to provide cooling. In some embodiments, the heat source 670 may be the condenser 720 of the vapor compression system 700, as discussed herein.

Therefore, there may be multiple thermal buses 600 and vapor compression systems 700 implemented in a single vehicle, each dedicated to servicing respective components within respective regions. For example, the system 1 of FIGS. 1A and 1B may include two thermal buses 600, one for each of the thermal zones 22, 42, with each thermal bus 600 including a vapor compression system 700. In this manner, there may be multiple miniature compressors, such as the compressor 710, within a single vehicle. Therefore, in some embodiments, a segmented compression system may be embodied where there are multiple such miniature compressors each servicing several thermal components in close proximity to the compressor. Such an arrangement allows for a more efficient and less costly thermal system, as less thermal energy and infrastructure, for example shorter fluid lines, is required to thermally service the nearby components.

Figure 8:
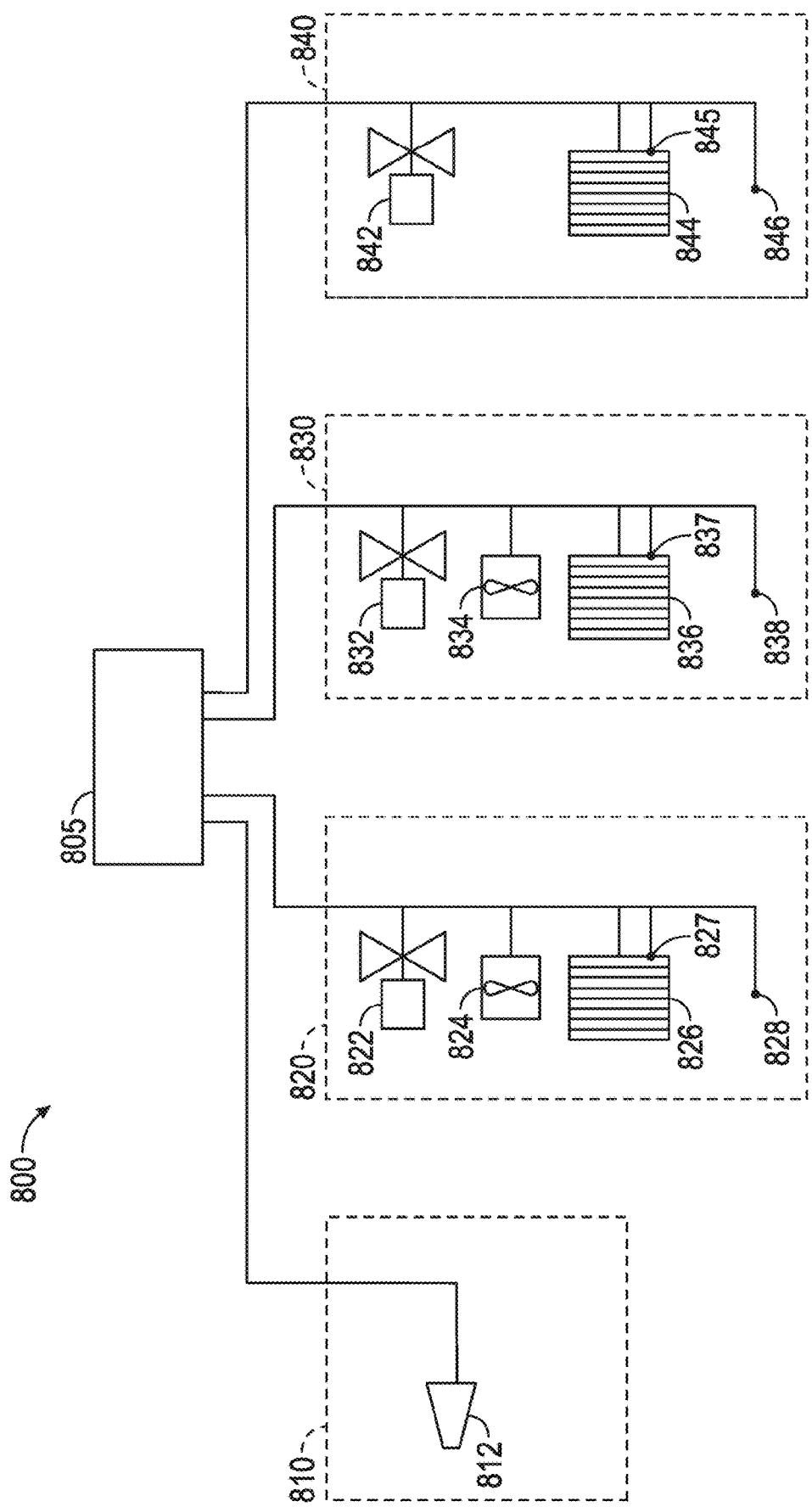
FIG. 8 is a schematic of an embodiment of a control system for controlling a thermal conditioning system.

FIG. 8 is a schematic of an embodiment of a control system 800 for controlling the thermal output of a thermal bus. The control system 800 may be coupled with and control various sensors and control devices. The sensors provide feedback on the thermal state of various components, and the control dev ices are used to adjust the provision of thermal conditioning accordingly (e.g., flow through or rate of a working fluid).

As shown, the control system 800 may include a controller 805. The controller 805 may include or be in electrical communication with the control modules 6 or 8 from FIGS. 1A-1B, for instance for a user to set desired temperature levels. The controller 805 may receive input from the control modules 6 or 8 and control one or more components in various regions. As shown, the controller 805 may be coupled (e.g., in electrical communication) with a first region 810, a second region 820, a third region 830 and/or a fourth region 840. The first region 810 may correspond to a thermal energy source, such as the thermal energy source 604, or a vapor compression system, such as the vapor compression system 700. The first region 810 may therefore include a miniature vapor compressor 812 to which the controller 805 is electrically coupled. The controller 805 may adjust the operation of the miniature vapor compressor 812, for example by altering the speed of the working medium. This adjustment may be based on feedback from various sensors, either within the first region 810 or within the other regions 820, 830, 840.

The controller 805 can be further electrically coupled with and control various components and sensors in the second region 820, including a fluid flow control device 822, a fan 824, a heat transfer device 826, and temperature sensors 827 and 828. The temperature sensor 827 is coupled (e.g., in thermal communication) with the heat transfer device 826. In some embodiments, the temperature sensor 827 may correspond with the first temperature sensor 622 and the heat transfer device 826 may correspond to the heat transfer device 616, for instance a heat exchanger, from the first region 601 of the thermal bus 600 shown in FIG. 6. The temperature sensor 828 may be coupled (e.g., in thermal communication) with a variety of features, including the various lines of the thermal conditioning system, such as the line 626 shown in FIG. 6. The temperature sensors 827, 828 provide temperature feedback to the controller 805 for the respective devices to which the temperature sensors 827, 828 are coupled. The controller 805 then analyzes the temperature data, along with other operating parameters of information such as a desired set temperature of a component, and if necessary adjusts the operation of one or more devices, such as the fluid flow control device 822 and/or the fan 824. The controller 805 may also adjust the operation of one or more devices in other regions, such as within the first, third or fourth regions 810, 810, 840. In some embodiments, the second region 820 may correspond to the first region 601, and the various devices and sensors therein, of the thermal bus 600 shown in FIG. 6.

The controller 805 can be further electrically coupled with and control various components and sensors in the third region 830, including a fluid flow control device 832, a fan 834, a heat transfer device 836, and temperature sensors 837 and 838. The interaction of the controller 805 with the third region 830 may be similar to the interaction of the controller with the second region 820, as discussed above. The temperature sensor 837 is coupled (e.g., in thermal communication) with the heat transfer device 836. In some embodiments, the temperature sensor 837 may correspond with the first temperature senior 642 and the heat transfer device 836 may correspond to the heat transfer device 636, for instance a heat exchanger, from the second region 602 of the thermal bus 600 shown in FIG. 6. The temperature sensor 838 may be coupled (e.g., in thermal communication) with a variety of features, including the various nodes of the thermal conditioning system, such as the second thermal node 648 shown in FIG. 6. The temperature sensors 837, 838 provide temperature feedback to the controller 805 for the respective devices to which the temperature sensors 837, 838 are coupled. The controller 805 then analyzes the temperature data, along with other operating parameters or information such as a desired set temperature of a component, and if necessary adjusts the operation of one or more devices, such as the fluid flow control device 832 and/or the fan 834. The controller 805 may also adjust the operation of one or more devices in other regions, such as within the first, second or fourth regions 810, 820, 840. In some embodiments, the third region 830 may correspond to the second region 602, and the various devices and sensors therein, of the thermal bus 600 shown in FIG. 6.

The controller 805 can be further electrically coupled with and control various components and sensors in the fourth region 840, including a fluid flow control device 842, a heat transfer device 844, and temperature sensors 845 and 846. The interaction of the controller 805 with the fourth region 840 may be similar to the interaction of the controller with the second region 820 and third region 830, as discussed above. The temperature sensor 845 is coupled (e.g., in thermal communication) with the heat transfer device 844. In some embodiments, the temperature sensor 845 may correspond with the temperature sensor 658 and the heat transfer device 844 may correspond to the heat transfer device 656, for instance a heat exchanger, from the third region 603 of the thermal bus 600 shown in FIG. 6. The temperature sensor 846 may be coupled (e.g., in thermal communication) with a variety of features, including the various nodes of the thermal conditioning system, such as the third thermal node 660 shown in FIG. 6. The temperature sensors 845, 846 provide temperature feedback to the controller 805 for the respective devices to which the temperature sensors 845, 846 are coupled. The controller 805 then analyzes the temperature data, along with other operating parameters or information such as a desired set temperature of a component, and if necessary adjusts the operation of one or more devices, such as the fluid flow control device 842. The controller 805 may also adjust the operation of one or more dev ices in other regions, such as within the first, second or third regions 810, 820, 830. In some embodiments, the fourth region 840 may correspond to the third region 603, and the various devices and sensors therein, of the thermal has 600 shown in FIG. 6.

Figure 9:
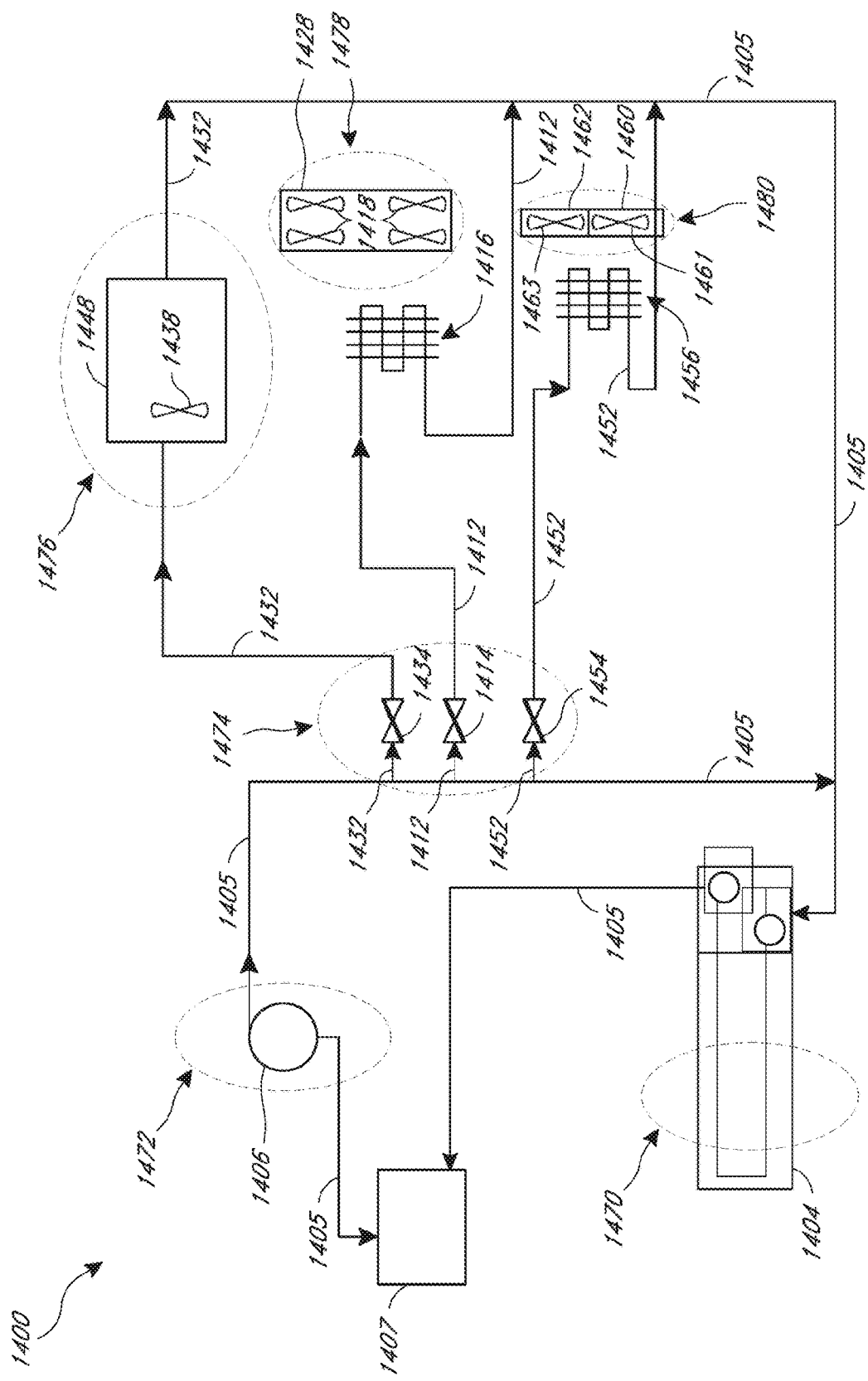
FIG. 9 is a schematic of another embodiment of a thermal conditioning system.

FIG. 9 is a schematic of another embodiment of a thermal conditioning system 1400 for thermally servicing multiple components. The thermal conditioning system 1400 may be controlled using various control systems and methods. The system 1400 may have the same or similar features as the system 600 described herein, unless otherwise stated.

The system 1400 may have components that are analogous, i.e. have the same and/or similar feature as, components of the system 600. As shown, the system 1400 may have a thermal energy source 1404, which may be analogous to the thermal energy source 604. In some embodiments, the thermal energy source 1404 may be a chilling unit that cools thermal media inside the main line or circuit 1405, which may be analogous to the line 605.

The system 1400 may have a coolant tank 1407, which may store coolant, such as a glycol. The tank 1407 may also be implemented with the system 600 in FIG. 1, for example in between the thermal energy source 604 and the pump 606 along the line 605. In FIG. 9, the line 1405 may be connected to the tank 1407 on one end and on another end connect the tank 1407 to a pump 1472. The pump 1472 may be analogous to the pump 606. The line 1405 may then continue to branches 1432, 1412 and 1452, which may be analogous, respectively, to branches 632, 612 and 652.

The branches 1432, 1412 and 1452 may contain valves 1434, 1414 and 1454, respectively, which may be analogously, respectively, to valves 634, 614 and 654. The branch 1432 may connect to a first thermal node 1448, which may be analogous to the second thermal node 648. The first thermal node 1448 may thermally condition a bin or other storage container. As shown, the first thermal node 1448 may contain a fan 1438 for providing thermal conditioning. The fan 1438 may be analogous to the fan 638 or 834. Further, any discussion herein of use of the fan 638 or 834, such as use with the various control systems, methods and/or techniques described herein, applies equally to the fan 1438, and vice versa. The branch 1432 then continues and connects back with the main line 1405, which then connects back to the thermal energy source 1404.

The branch 1412 may connect to a heat transfer device 1416 that services a second thermal node 1428, which components may be analogous, respectively, to the heat transfer device 616 and the first thermal node 628. The second thermal node 1428 may thermally condition one or more seats or portions thereof. In some embodiments, the second thermal node 1428 may include one or more fans 1418. As shown, there may be four fans 1418. In some embodiments, each portion of a seat may use one of the fans 1418. For example, there may be two seats, each having two portions, such as a bottom or cushion portion and a seatback portion. A single fan 1418 may be used for each of the four portions in that example. In some embodiments, them may be more or fewer than four fans 1418 and distributed in a variety of configurations among the seats or portions thereof. The fans 1418 may be analogous to the fan 618 or 824. Further, any discussion herein of use of the fan 618 or 824, such use with the various control systems, methods and/or techniques described herein applies equally to the fan 1418, and vice versa. The branch 1412 then continues and connects back with the main line 1405, which then connects back to the thermal energy source 1404.

The branch 1452 may connect to a heat transfer device 1456 that services a third and fourth thermal node 1460 and 1462. The heat transfer device 1456 may be analogous to the heat transfer device 656. The third and fourth thermal nodes 1460 and 1462 may each be analogous to the first thermal node 628. In some embodiments, the third and fourth thermal nodes 1460 and 1462 may be, respectively, first and second cup holders. As shown, the third thermal node 1460 may include one or more fans 1461, and the fourth thermal node 1462 may include one or more fans 1463. Thus, one difference between the system 1400 and the system 600 is that the system 1400 may use convection to provide thermal conditioning to cup holder components. Further, any discussion herein of use of a fan with the third region 603 or the fourth region 840 may employ the arrangement as shown in the system 1400. In particular, any discussion herein of use of the various control systems, methods and/or techniques described herein to thermally condition one or more cup holder components using one or more blowers, such as a fan, may employ the third thermal node 1460 as the first cup holder and the fourth thermal node 1462 as the second cup holder, along with corresponding fans 1461 and 1463. The branch 1452 then continues and connects back with the main line 1405, which then connects back to the thermal energy source 1404.

Further illustrated in FIG. 9 are various control points 1470, 1472, 1474, 1476, 1478 and 1480. The control points indicate components of the system 1400 that may be controlled using any of the various control systems, methods and/or techniques described herein, in some embodiments, the control point 1470 may be controlled for instance to control a thermal energy source. For example, a compressor speed may be adjusted Other components of the thermal energy source may be controlled Therefore, any discussion herein of control of the thermal energy source or components thereof may be performed by applying the various control systems, methods and/or techniques described herein to the control point 1470.

In some embodiments, the control point 1472 may be controlled for instance to control a pump. For example, a pump speed may be adjusted Therefore, any discussion herein of control of a pump may be performed by applying the various control systems, methods and/or techniques described herein to the control point 1472.

In some embodiments, the control point 1474 may be controlled for instance to control one or more valves. For example, a valve may be opened or closed. Therefore, any discussion herein of control of a valve may be performed by applying the various control systems, methods and/or techniques described herein to the control point 1474.

In some embodiments, the control point 1476 may be controlled for instance to control thermal conditioning of a first thermal node or components thereof. For example, one or more blower speeds may be adjusted for controlling thermal conditioning of a bin Other components of the first thermal node may be controlled. Therefore, any discussion herein of control of a first thermal node or components thereof may be performed by applying the various control systems, methods and/or techniques described herein to the control point 1476.

In some embodiments, the control point 1478 may be controlled for instance to control thermal conditioning of a second thermal node or components thereof. For example, one or more blower speeds may be adjusted for controlling thermal conditioning of a seat. Other components of the second thermal node may be controlled. Therefore, any discussion herein of control of a second thermal node or components thereof may be performed by applying the various control systems, methods and/or techniques described herein to the control point 1478.

In some embodiments, the control point 1480 may be controlled for instance to control thermal conditioning of a third and/or fourth thermal node or components thereof. For example, one or more blower speeds may be adjusted for controlling thermal conditioning of one or more cup holders. Other components of the third and/or fourth thermal nodes may be controlled. Therefore, any discussion herein of control of a third and/or fourth thermal node or components thereof may be performed by applying the various control systems, methods and/or techniques described herein to the control point 1480.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the invention is to cover all modifications, equivalents, and alternatives falling within the spirit and scope of the various embodiments described and the appended claims Any methods disclosed herein need not be performed in the order recited.

The ranges disclosed herein also encompass any and all overlap, sub-ranges, and combinations thereof language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. Features of embodiments disclosed herein preceded by a term such as "approximately", "about", and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the air will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.) In those instances where a convention analogous to "at least one of A, B, or C, etc." is used, in general such a construction is intended in the sense one having skill in the art would understand the convention (e.g., "a system having at least one of A, B, or" would include hut not be limited to systems that have A alone, B alone, C alone, A and B together, A and C together, B and C together, and/or A, B, and C together, etc.). It will be further understood by those within the art that virtually any disjunctive word and/or phrase presenting, two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject mailer has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A thermal conditioning system for providing heating and cooling to multiple thermal regions of a vehicle, the system comprising:
   a fluid circuit configured to circulate a first working fluid in the fluid circuit;
   a thermal energy source in thermal communication with the fluid circuit, the thermal energy source configured to selectively heat and cool the first working fluid in the fluid circuit, wherein the thermal energy source is separate from a heating, ventilation and air conditioning (HVAC) system of the vehicle;
   a first conduit in fluid communication with the fluid circuit, the first conduit configured to convey at least some of the first working fluid in the first conduit;
   a first heat transfer device in thermal communication with the first conduit;

a first thermal region, wherein the first heat transfer device is in thermal communication with the first thermal region and heats or cools the first thermal region via thermal energy transferred from or to the at least some of the first working fluid in the first conduit;

a second conduit in fluid communication with the fluid circuit, the second conduit configured to convey at least some of the first working fluid in the second conduit;

a second heat transfer device in thermal communication with the second conduit;

a second thermal region, wherein the second heat transfer device is in thermal communication with the first thermal region and heats or cools the second thermal region via thermal energy transferred from or to the at least some of the first working fluid in the second conduit.

2. The system of claim 1, wherein the first thermal region comprises a seat, wherein the first heat transfer device is in thermal communication with the seat and heats or cools the seat via thermal energy transferred from or to the at least some of the first working fluid in the first conduit.

3. The system of claim 2, wherein the second thermal region comprises an occupant area of the vehicle, wherein the second heat transfer device is in thermal communication with the occupant area and heats or cools the occupant area via thermal energy transferred from or to the at least some of the first working fluid in the second conduit.

4. The system of claim 1, further comprising a third conduit in thermal communication with the first heat transfer device and the first thermal region, wherein the first heat transfer device transfers thermal energy between the first conduit and the third conduit.

5. The system of claim 4, wherein the first thermal region comprises a fan configured to convey air in the third conduit, wherein the air is heated or cooled via thermal energy transferred from or to the first working fluid in the second conduit by the second heat transfer device.

6. The system of claim 5, wherein the first thermal region comprises a seat.

7. The system of claim 5, wherein the first thermal region comprises an open loop air system.

8. The system of claim 1, wherein the second thermal region comprises an occupant area of the vehicle, wherein the second heat transfer device is in thermal communication with the occupant area and heats or cools the occupant area via thermal energy transferred from or to the at least some of the first working fluid in the second conduit.

9. The system of claim 8, wherein the second thermal region comprises a fan and a vent that are configured to blow conditioned air towards the occupant area.

10. The system of claim 1, wherein the second thermal region comprises a closed loop air system.

11. The system of claim 1, further comprising a fourth conduit in thermal communication with the second heat transfer device and the second thermal region, wherein the second heat transfer device transfers thermal energy between the second conduit and the fourth conduit.

12. The system of claim 11, wherein the second thermal region comprises a fan configured to convey air in the fourth conduit, wherein the air is heated or cooled via thermal energy transferred from or to the first working fluid in the second conduit by the second heat transfer device.

13. The system of claim 12, wherein the second thermal region comprises an occupant area of the vehicle.

14. The system of claim 13, further comprising a vent, wherein the fan and vent are configured to blow the air towards the occupant area.

15. The system of claim 1, wherein a portion of the fluid circuit is in thermal communication with an evaporator of the thermal energy source and another portion of the line is in thermal communication with a condenser of the thermal energy source.

16. The system of claim 15, further comprising a valve configured to control which portion of the fluid circuit receives the working fluid.

17. The system of claim 1, further comprising:
a first flow control device configured to regulate flow of the first working fluid through the first conduit; and
a second flow control device configured to regulate flow of the first working fluid through the second conduit.

18. The system of claim 1, wherein the first working fluid is a liquid.

19. The system of claim 1, further comprising:
a pump configured to circulate the first working fluid through the fluid circuit; and
a flow sensor coupled with the fluid circuit and configured to detect a flow of the first working fluid pumped through the fluid circuit.

20. The system of claim 1, further comprising a first temperature sensor in the first thermal region and a second thermal sensor in the second thermal region, wherein the thermal energy source is configured to be adjusted based on one or more temperatures detected by the first or second sensor.

21. The system of claim 1, further comprising a control system configured to adjust an output of heating or cooling provided to the first or second thermal region.

22. The system of claim 1, further comprising a heat source separate from the HVAC system of the vehicle and configured to heat the first working fluid.

23. The system of claim 1, further comprising an other thermal energy source separate from the HVAC system of the vehicle and in selective thermal communication with the first thermal region.

24. The system of claim 23, wherein the other thermal energy source is in selective thermal communication with the first thermal region via the fluid circuit.

25. The system of claim 23, wherein the other thermal energy source is configured to heat the first thermal region via heating the at least some of the first working fluid conveyed in the first conduit.

26. A thermal conditioning system for providing heating and cooling to multiple thermal regions of a vehicle, the system comprising:
a fluid circuit configured to circulate a first working fluid in the fluid circuit;
a first thermal energy source in thermal communication with the fluid circuit, the first thermal energy source configured to selectively heat the first working fluid in the fluid circuit, wherein the first thermal energy source is separate from a heating, ventilation and air conditioning (HVAC) system of the vehicle;
a second thermal energy source in thermal communication with the fluid circuit, the second thermal energy source configured to selectively cool the first working fluid in the fluid circuit, wherein the second thermal energy source is separate from the HVAC system of the vehicle;
a first conduit in fluid communication with the fluid circuit, the first conduit configured to convey at least some of the first working fluid in the first conduit;
a first heat transfer device in thermal communication with the first conduit;

a first thermal region, wherein the first heat transfer device is in thermal communication with the first thermal region and heats or cools the first thermal region via thermal energy transferred from or to the at least some of the first working fluid in the first conduit;

a second conduit in fluid communication with the fluid circuit, the second conduit configured to convey at least some of the first working fluid in the second conduit;

a second heat transfer device in thermal communication with the second conduit;

a second thermal region, wherein the second heat transfer device is in thermal communication with the first thermal region and heats or cools the second thermal region via thermal energy transferred from or to the at least some of the first working fluid in the second conduit.

27. The system of claim 26, wherein the first thermal region comprises a seat, wherein the first heat transfer device is in thermal communication with the seat and heats or cools the seat via thermal energy transferred from or to the at least some of the first working fluid in the first conduit.

28. The system of claim 27, wherein the second thermal region comprises an occupant area of the vehicle, wherein the second heat transfer device is in thermal communication with the occupant area and heats or cools the occupant area via thermal energy transferred from or to the at least some of the first working fluid in the second conduit.

29. The system of claim 26, further comprising:

a third conduit in thermal communication with the first heat transfer device and the first thermal region, wherein the first heat transfer device transfers thermal energy between the first conduit and the third conduit, wherein the first thermal region comprises a first fan configured to convey first air in the third conduit, wherein the first air is heated or cooled via thermal energy transferred from or to the first working fluid in the second conduit by the second heat transfer device, and wherein the first thermal region comprises a seat.

30. The system of claim 29, further comprising:

a fourth conduit in thermal communication with the second heat transfer device and the second thermal region, wherein the second heat transfer device transfers thermal energy between the second conduit and the fourth conduit, wherein the second thermal region comprises a second fan configured to convey second air in the fourth conduit, wherein the second air is heated or cooled via thermal energy transferred from or to the first working fluid in the second conduit by the second heat transfer device, and wherein the second thermal region comprises an occupant area of the vehicle; and a vent, wherein the second fan and vent are configured to blow the second air towards the occupant area.

* * * * *

UNITED STATES PATENT AND TRADEMARK OFFICE
CERTIFICATE OF CORRECTION

PATENT NO. : 11,358,433 B2
APPLICATION NO. : 16/803771
DATED : June 14, 2022
INVENTOR(S) : Ioannis Androulakis It is certified that error appears in the above-identified patent and that said Letters Patent is hereby corrected as shown below:

On the Title Page

Column 2, item [57], Line 2, delete "cat" and insert -- heat --.

In the Specification

Column 1, Line 35, delete "known" and insert -- known. --.

Column 2, Line 40, delete "(e.g." and insert -- (e.g., --.

Column 2, Line 49, delete "following" and insert -- following: --.

Column 2, Line 51, delete "circuit," and insert -- circuit; --.

Column 2, Line 53, delete "fluid," and insert -- fluid; --.

Column 2, Line 63, delete "conduit," and insert -- conduit; --.

Column 2, Line 65, delete "conduit," and insert -- conduit; --.

Column 3, Lines 2-3, delete "dev ice," and insert -- device, --.

Column 3, Line 3, delete "near" and insert -- heat --.

Column 3, Line 23, delete "conduit," and insert -- conduit; --.

Column 3, Line 43, delete "battery," and insert -- battery; --.

Column 3, Line 44, delete "buttery" and insert -- battery --.

Signed and Sealed this
Twenty-fifth Day of April, 2023

Katherine Kelly Vidal
*Director of the United States Patent and Trademark Office*

Column 3, Line 46, delete "operating," and insert -- operating; --.

Column 3, Line 49, delete "fluid," and insert -- fluid; --.

Column 3, Line 66, delete "circuit," and insert -- circuit; --.

Column 4, Line 3, delete "conduit," and insert -- conduit; --.

Column 4, Line 32, delete "following" and insert -- following: --.

Column 4, Line 33, delete "therethrough:" and insert -- therethrough; --.

Column 4, Line 36, delete "mam" and insert -- main --.

Column 4, Line 37, delete "region," and insert -- region; --.

Column 4, Line 52, delete "component," and insert -- component; --.

Column 4, Line 60, delete "holder," and insert -- holder; --.

Column 4, Line 60, delete "seat," and insert -- seat; --.

Column 4, Line 61, delete "holder," and insert -- holder; --.

Column 4, Line 64, delete "vehicle," and insert -- vehicle; --.

Column 5, Line 20, delete "following" and insert -- following: --.

Column 5, Line 58, delete "system," and insert -- system; --.

Column 6, Line 12, delete "conduit," and insert -- conduit; --.

Column 7, Line 4, delete "limning." and insert -- limiting. --.

Column 8, Line 4, delete "ail" and insert -- all --.

Column 8, Line 13, delete "legion" and insert -- region --.

Column 8, Line 45, delete "and/ordinary" and insert -- and ordinary --.

Column 8, Line 49, delete "air)" and insert -- air). --.

Column 8, Line 50, delete "and/ordinary" and insert -- and ordinary --.

Column 8, Line 55, delete "and/ordinary" and insert -- and ordinary --.

CERTIFICATE OF CORRECTION (continued)
U.S. Pat. No. 11,358,433 B2

Column 8, Line 61, delete "and/ordinary" and insert -- and ordinary --.

Column 9, Line 34, delete "Ire" and insert -- be --.

Column 9, Line 51, delete "loaned" and insert -- located --.

Column 11, Line 5, delete "thud" and insert -- third --.

Column 11, Line 5, delete "sealing" and insert -- seating --.

Column 11, Line 5, delete "from" and insert -- front --.

Column 11, Line 5, delete "sealing" and insert -- seating --.

Column 13, Line 54, delete "210" and insert -- 216 --.

Column 13, Line 65, delete "beating" and insert -- heating --.

Column 14, Line 30, delete "seal" and insert -- seat --.

Column 14, Line 55, delete "dev ice" and insert -- device --.

Column 16, Line 28, delete "252" and insert -- 232 --.

Column 16, Line 42, delete "tor" and insert -- for --.

Column 17, Line 45, delete "554 the" and insert -- 554. The --.

Column 17, Line 55, delete "of" and insert -- or --.

Column 17, Line 59, delete "5F," and insert -- 5E, --.

Column 17, Line 62, delete "plate" and insert -- plate. --.

Column 18, Line 18, delete "(e.g." and insert -- (e.g., --.

Column 18, Line 51, delete "dev ice" and insert -- device --.

Column 20, Line 42, delete "example" and insert -- example, --.

Column 21, Line 34, delete "mote" and insert -- more --.

Column 22, Line 31, delete "m" and insert -- in --.

Column 22, Line 59, delete "bused" and insert -- based --.

Column 22, Line 62, delete "e g" and insert -- e.g. --.

Column 23, Line 1, delete "derails" and insert -- details --.

Column 23, Line 39, delete "diagnostic-operational" and insert -- diagnostic/operational --.

Column 23, Line 47, delete "diagnostic operational" and insert -- diagnostic/operational --.

Column 23, Line 50, delete "control" and insert -- control, --.

Column 24, Line 29, delete "aspect" and insert -- respect --.

Column 24, Line 50, delete "hack" and insert -- back --.

Column 24, Line 59, delete "beat" and insert -- heat --.

Column 25, Line 17, delete "as" and insert -- as, --.

Column 25, Line 36, delete "coded" and insert -- cooled --.

Column 26, Line 15, delete "of" and insert -- or --.

Column 26, Line 30, delete "fan" and insert -- fan, --.

Column 26, Line 62, delete "dram" and insert -- drain --.

Column 27, Line 33, delete "present" and insert -- prevent --.

Column 27, Line 35, delete "tubing," and insert -- tubing --.

Column 29, Line 9, delete "dev ices" and insert -- devices --.

Column 29, Line 50, delete "of" and insert -- or --.

Column 29, Line 56, delete "810," and insert -- 830, --.

Column 30, Line 3, delete "seniors" and insert -- sensor --.

Column 30, Line 51, delete "dev ices" and insert -- devices --.

Column 30, Line 55, delete "has" and insert -- bus --.

Column 31, Line 40, delete "them" and insert -- there --.

Column 31, Line 46, delete "herein" and insert -- herein, --.

CERTIFICATE OF CORRECTION (continued)
U.S. Pat. No. 11,358,433 B2

Column 32, Line 12, delete "herein, in" and insert -- herein. In --.

Column 32, Line 15, delete "adjusted" and insert -- adjusted. --.

Column 32, Line 16, delete "controlled" and insert -- controlled. --.

Column 32, Line 23, delete "adjusted" and insert -- adjusted. --.

Column 32, Line 37, delete "bin" and insert -- bin. --.

Column 33, Line 32, delete "claims" and insert -- claims. --.

Column 33, Line 35, delete "thereof language" and insert -- thereof. Language --.

Column 34, Line 15, delete "air" and insert -- art --.

Column 34, Line 27, delete "etc.)" and insert -- etc.). --.

Column 34, Line 31, delete "or"" and insert -- or C" --.

Column 34, Line 36, delete "presenting," and insert -- presenting --.

Column 34, Line 42, delete "mailer" and insert -- matter --.